(12) United States Patent
Sahara

(10) Patent No.: US 8,861,050 B2
(45) Date of Patent: *Oct. 14, 2014

(54) IMAGE READING APPARATUS
(71) Applicant: Brother Kogyo Kabushiki Kaisha, Nagoya (JP)
(72) Inventor: Shinya Sahara, Nagoya (JP)
(73) Assignee: Brother Kogyo Kabushiki Kaisha, Nagoya-Shi, Aichi-Ken (JP)
( * ) Notice: Subject to any disclaimer, the term of this patent is extended or adjusted under 35 U.S.C. 154(b) by 0 days.

This patent is subject to a terminal disclaimer.

(21) Appl. No.: 13/851,096
(22) Filed: Mar. 26, 2013
(65) Prior Publication Data
US 2014/0092452 A1   Apr. 3, 2014

(30) Foreign Application Priority Data

Sep. 28, 2012   (JP) .................. 2012-218596

(51) Int. Cl.
| G06K 15/00 | (2006.01) |
| G06F 3/12 | (2006.01) |
| H04N 1/04 | (2006.01) |
| G03G 15/20 | (2006.01) |
| G03G 15/00 | (2006.01) |
| B65H 1/08 | (2006.01) |
| B65H 29/66 | (2006.01) |
| B65H 7/02 | (2006.01) |
| B42C 13/00 | (2006.01) |
| H04N 1/00 | (2006.01) |
| H04N 1/10 | (2006.01) |
| H04N 1/193 | (2006.01) |
| H04N 1/12 | (2006.01) |

(52) U.S. Cl.
CPC .... H04N 1/00588 (2013.01); *H04N 2201/0081* (2013.01); H04N 1/00591 (2013.01); H04N 1/1017 (2013.01); H04N 1/193 (2013.01); H04N 1/12 (2013.01); *H04N 2201/044* (2013.01)

USPC ......... 358/498; 358/1.14; 358/1.13; 358/496; 399/323; 399/389; 271/126; 271/65; 271/265.01; 412/12

(58) Field of Classification Search
USPC ................ 358/1.14, 496, 1.13; 399/323, 389; 271/126, 65, 265.01; 412/12
See application file for complete search history.

(56) References Cited

U.S. PATENT DOCUMENTS

| 5,634,635 | A | | 6/1997 | Kobayashi et al. |
| 5,758,040 | A | * | 5/1998 | Ichimura et al. ............. 358/1.14 |

(Continued)

FOREIGN PATENT DOCUMENTS

| JP | H05-307293 A | 11/1993 |
| JP | H08-067412 A | 3/1996 |

(Continued)

*Primary Examiner* — Charlotte M Baker
*Assistant Examiner* — Rury Grisham
(74) *Attorney, Agent, or Firm* — Merchant & Gould PC

(57) ABSTRACT

An image reading apparatus includes a reading unit, a feeding unit, a carriage holding the reading unit, a motor, a motor-side transmission gear, a feeding unit-side transmission gear, a carriage-side transmission gear, a switching gear which switches between a meshing state of meshing with the feeding unit-side transmission gear at a feeding unit-side position and a meshing state of meshing with the carriage-side transmission gear at a carriage-side position, a restraint member which applies a restraint force for restraining the switching of the switching gear, and a motor control unit which when switching the switching gear between the carriage-side position and the feeding unit-side position, executes a large torque control of controlling the motor to generate a switching torque which is larger than a moving reading torque to be generated by the motor at a time of document reading when executing a moving reading.

12 Claims, 17 Drawing Sheets

(56) References Cited

U.S. PATENT DOCUMENTS

| | | | |
|---|---|---|---|
| 6,722,648 B2* | 4/2004 | Tsusaka et al. | 271/65 |
| 8,237,997 B2* | 8/2012 | Okumura | 358/496 |
| 8,274,673 B2* | 9/2012 | Okumura et al. | 358/1.13 |
| 2002/0038933 A1* | 4/2002 | Tsusaka et al. | 271/126 |
| 2006/0239731 A1* | 10/2006 | Suzuki et al. | 399/389 |
| 2007/0116498 A1* | 5/2007 | Nakano et al. | 399/323 |
| 2008/0122166 A1* | 5/2008 | Fukube | 271/265.01 |
| 2009/0081001 A1* | 3/2009 | Ota et al. | 412/12 |

FOREIGN PATENT DOCUMENTS

| | | |
|---|---|---|
| JP | H10-051598 A | 2/1998 |
| JP | 2006-086817 A | 3/2006 |
| JP | 2008-153837 A | 7/2008 |

* cited by examiner

FIG. 8

|  | USAGE | CURRENT VALUE (%) | EXCITING METHOD | ROTATING SPEED [RPM] | TORQUE |
|---|---|---|---|---|---|
| TB1 | DRIVING SWITCHING | 80 | 2-2 PHASE | 547.1 | LARGE |
| TB2 | ROUGH DETECTION | 40 | w1-2 PHASE | 547.1 | MEDIUM |
| TB3 | PRECISE DETECTION | 40 | w1-2 PHASE | 205.2 | LARGE |
| TB4 | FB MOVING | 40 | 2w1-2 PHASE | 1015.5 | SMALL |
| TB5 | FB READING (MAXIMUM SPEED) | 40 | 2w1-2 PHASE | 1015.5 | SMALL |

IMAGE READING APPARATUS

CROSS-REFERENCE TO RELATED APPLICATION

This application claims priority from Japanese Patent Application No. 2012-218596, filed on Sep. 28, 2012, the entire subject matter of which is incorporated herein by reference.

TECHNICAL FIELD

Aspects of the present invention relate to an image reading apparatus, and more particularly to, an image reading apparatus configured to drive a feeding device for feeding a sheet of document to a reading unit such as CIS and a moving device for moving the reading unit, with power from one motor.

BACKGROUND

There has been known an image reading apparatus configured to drive a feeding device which feeds a sheet of document to a reading unit such as CIS and a moving device, for example a carriage, which moves the reading unit, with power from one motor (for example, refer to JP-A-2006-86817). According to the image reading apparatus, a position of a switching gear which is a transmission unit for transmitting driving power of the motor is switched between a feeding unit-side position where the switching gear transmits the power to the feeding device and a carriage-side position where the switching gear transmits the power to the moving device. Thereby, it is possible to drive the feeding device and the moving device by one motor.

SUMMARY

However, when a reaction force from a feeding device-side transmission gear or a moving device-side transmission gear is insufficient, the switching gear cannot be appropriately separated from the feeding device-side transmission gear or the moving device-side transmission gear. As a result, a rotation of the switching gear may step out from a rotation of the motor.

Accordingly, an aspect of the present invention provides a technology capable of suppressing or preventing stepping out of a rotation of a switching gear from a rotation of a motor in a configuration of switching a switching gear between a carriage-side position and a feeding unit-side position.

According to one illustrative aspect of the invention, there is provided an image reading apparatus including a reading unit, a feeding unit, a carriage, a motor, a motor-side transmission gear, a feeding unit-side transmission gear, a carriage-side transmission gear, a switching gear, a restraint member, and a motor control unit. The reading unit is configured to read an image of a document. The feeding unit is configured to feed the document. The carriage is configured to be moved in a predetermined direction while holding the reading unit. The motor-side transmission gear is configured to transmit power supplied from the motor. The feeding unit-side transmission gear is configured to transmit the power to the feeding unit when executing a feeding reading of the reading unit reading the image of the document which is fed by the feeding unit. The carriage-side transmission gear is configured to transmit the power to the carriage when executing a moving reading of the reading unit reading the image of the document while moving the carriage. The switching gear is configured to switch between a meshing state of meshing with the feeding unit-side transmission gear at a feeding unit-side position where the switching gear couples the motor-side transmission gear and the feeding unit-side transmission gear when executing the feeding reading and a meshing state of meshing with the carriage-side transmission gear at a carriage-side position where the switching gear couples the motor-side transmission gear and the carriage-side transmission gear when executing the moving reading. The restraint member is configured to apply, to the switching gear, a restraint force for restraining the switching of the switching gear when executing the moving reading or the feeding reading. The motor control unit is configured, in a case when switching the switching gear which is restrained from switching by the restraint member between the carriage-side position and the feeding unit-side position, to execute a large torque control of controlling the motor to generate a switching torque which is larger than a moving reading torque to be generated by the motor at a time of document reading when executing the moving reading and which causes the switching gear to switch against the restraint force of the restraint member.

According to the above configuration, when switching a position of the switching gear which is restrained from switching by the restraint member, the motor generates the switching torque which is larger than the moving reading torque to be generated by the motor at the time of document reading when executing the moving reading and which causes the switching gear to switch against the restraint force of the restraint member. Therefore, the switching gear can securely separate from the conveyance unit-side transmission gear or the carriage-side transmission gear. As a result, in the configuration of switching the switching gear between the carriage-side position and the conveyance unit-side position, it is possible to suppress or prevent the rotation of the switching gear from stepping out from the rotation of the motor.

BRIEF DESCRIPTION OF THE DRAWINGS

The above and other aspects of the present invention will become more apparent and more readily appreciated from the following description of exemplary embodiments of the present invention taken in conjunction with the attached drawings, in which:

FIG. 8 shows a driving table of a motor;

FIG. 9 is a flowchart showing an operation of the image reading apparatus when a power supply is on;

FIG. 10 is a flowchart showing processing in a motor torque control when the power supply is on;

FIG. 11 is a flowchart showing processing in the motor torque control when the power supply is on;

FIG. 12 is a flowchart showing processing in the motor torque control when the power supply is on;

FIG. 13 is a flowchart showing processing in the motor torque control when the power supply is on;

FIG. 14 is a flowchart showing processing in the motor torque control when the power supply is on;

FIG. 15 is a flowchart showing processing in the motor torque control when the power supply is on;

DETAILED DESCRIPTION

An exemplary embodiment of the invention will be described with reference to FIGS. 1 to 17.

1. External Configuration of Image Reading Apparatus

Figure 1:
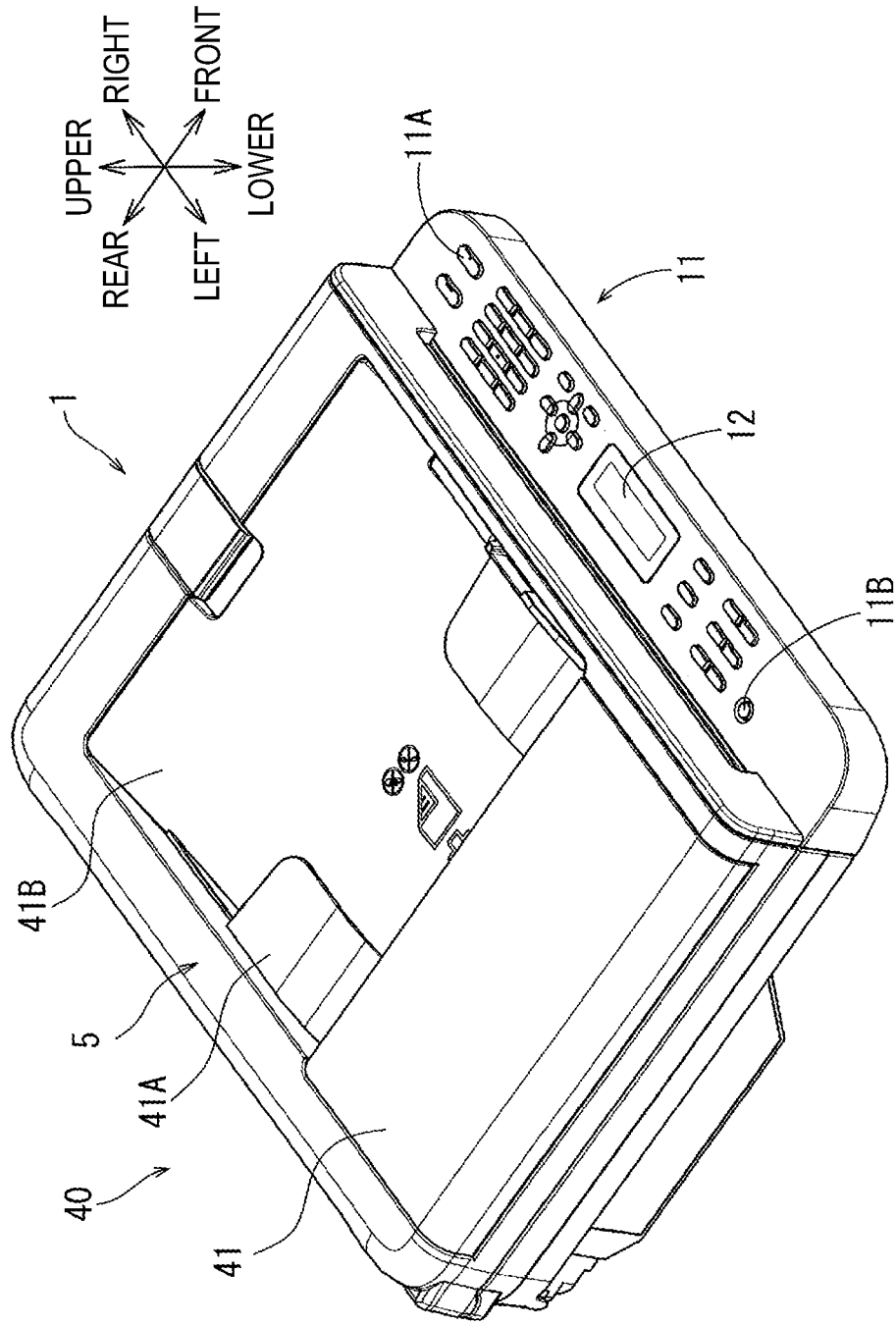
FIG. 1 is a perspective view showing an external configuration of an image reading apparatus according to an exemplary embodiment of the invention, showing a state where a document cover is closed.
Figure 3:
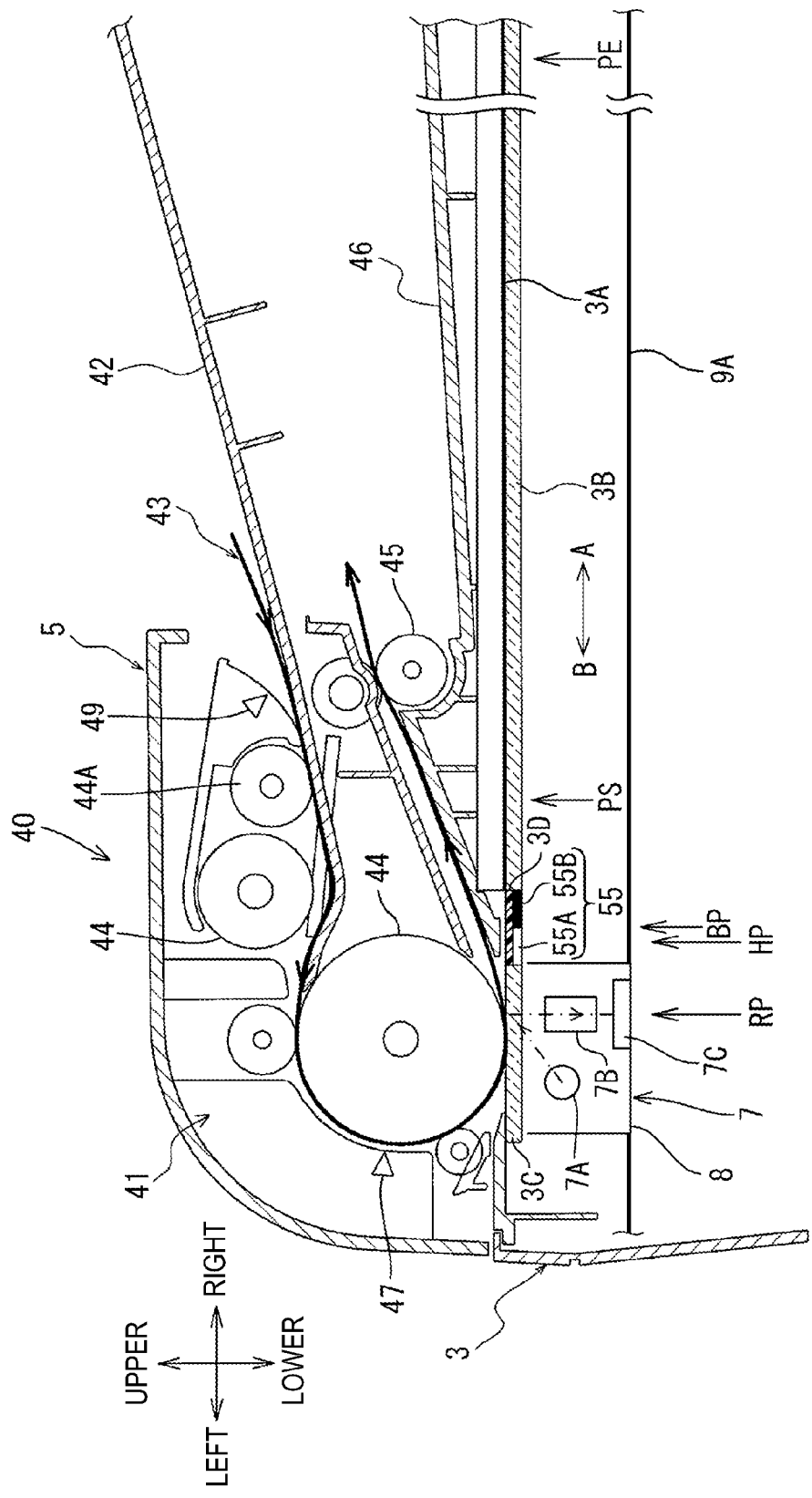
FIG. 3 is a schematic sectional view of the image reading apparatus according to the exemplary embodiment of the invention.

As shown in FIG. 3, an image reading apparatus 1 includes a reading unit 7, a carriage 8, an automatic document feeder (ADF) device 40, a document platen 3, a driving force transmission mechanism and the like. Also, as shown in FIG. 1, a front side of the image reading apparatus 1 is provided with an operation unit 11 having a variety of buttons and a display unit 12 configured by a liquid crystal display, for example.

The image reading apparatus 1 has, as an image reading method, a moving reading (hereinafter, referred to as 'FB (Flat Bed) reading') of reading an image while moving the carriage 8 and a feeding reading (hereinafter, referred to as 'ADF reading') of reading a document being fed by feeding units 44, 45 (refer to FIG. 3). In the meantime, the image reading apparatus 1 may be a stand-alone scanner apparatus or copier or a part of a so-called multi-function machine having a print function and a FAX function.

Figure 2:
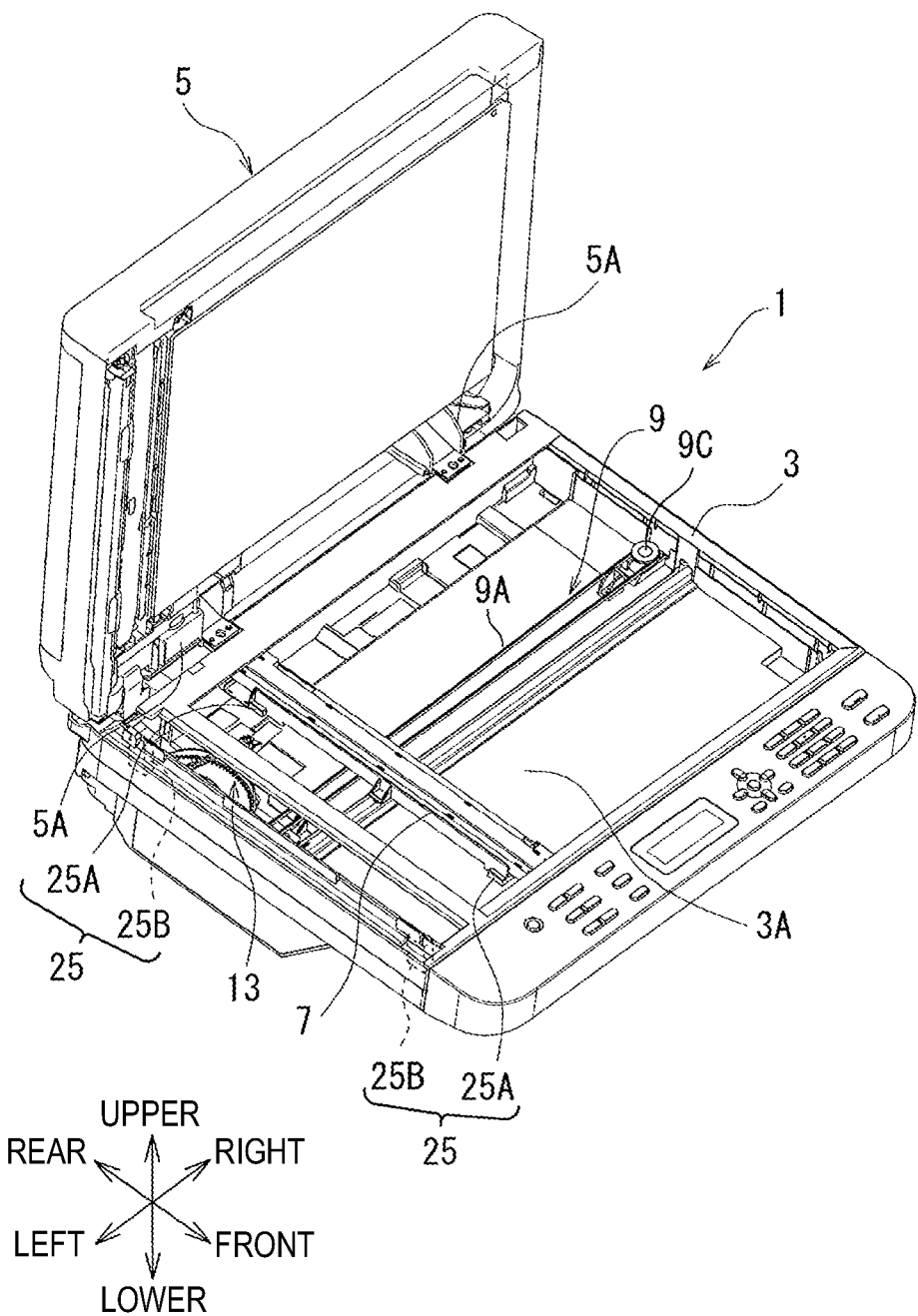
FIG. 2 is a perspective view showing an external configuration of the image reading apparatus according to the exemplary embodiment of the invention, showing a state where the document cover is opened.

As shown in FIG. 2, the document platen 3 includes a first reading window which is closed by a transparent platen 3B such as glass and acryl. A setting surface 3A is configured by the platen 3B. An upper surface-side of the document platen 3 is mounted with a document cover 5 through a hinge mechanism 5A.

Therefore, the document cover 5 can be rotated between a position of covering the document platen 3 (refer to FIG. 1) and a position spaced from the document platen 3 (refer to FIG. 2). In the meantime, when executing the FB reading, a user opens upward the document cover 5 with a manual operation and then set a document on the setting surface 3A.

The reading unit 7 configured to move along the setting surface 3A is provided below the setting surface 3A (refer to FIG. 3). The reading unit 7 receives a light, which is scanned toward and then reflected on the document, and generates an electric signal based on the received light. Then, the image reading apparatus 1 converts an image such as characters on the document into an electric signal to thus read the image through the reading unit 7.

The reading unit 7 is configured to read a document by a CIS (Contact Image Sensor) type. The reading unit 7 includes a linear image sensor 7C having a plurality of light receiving elements vertically aligned in a linear shape with respect to a drawing sheet of FIG. 3, a light source 7A having light emitting diodes of three colors (RGB) and the like and a rod lens array 7B imaging reflected light, which is reflected on the document and the like, on the respective light receiving elements of the linear image sensor 7C. The carriage 8 holds the reading unit 7 and is coupled to a toothed belt 9A and is moved in arrow A or B direction as the toothed belt 9A moves. The toothed belt 9A is driven by the driving force transmission mechanism (which will be described later) through a first toothed pulley 9B (refer to FIG. 4). In the meantime, the reading unit 7 is not limited to the CIS type and may be a so-called CCD type using a reduction optical system and CCD (charge-coupled device) image sensor.

When reading the document set on the platen 3B, i.e., when executing the FB reading, the reading unit 7 reads the document with being conveyed from a standby position WP in a direction (A direction in FIG. 3) parallel with a platen surface of the platen 3B at constant speed by the carriage 8 coupled to the toothed belt 9A. At this time, a reading range in the conveying direction is from a reading starting position PS to a reading ending position PE shown in FIG. 3, for example. In this exemplary embodiment, the reading starting position PS is a same position irrespective of the reading range of the document and the reading ending position PE is varied depending on the reading range of the document.

In the meantime, when reading the document which is fed by the ADF device 40, i.e., when executing the ADF reading, the reading unit 7 reads the document 5 with being held at a feeding reading position (hereinafter, referred to as 'ADF reading position') RP just below a second reading window 3C by the carriage 8.

Also, a moving mechanism 9 has a first toothed pulley 9B, a second toothed pulley 9C fixed to the document platen 3, the toothed belt 9A looped around the first toothed pulley 9B and the second toothed pulley 9C, and the like. The toothed belt 9A is rotated by obtaining a driving force from the first toothed pulley 9B.

The carriage 8 is connected to the toothed pulley 9A. Hence, the carriage 8 moves in correspondence to a rotating direction of the toothed belt 9A. The first toothed pulley 9B is arranged at one end side in the moving direction of the reading unit 7. The second toothed pulley 9C is arranged at the other end side in the moving direction of the reading unit 7.

In the meantime, the second reading window 3C is also closed by a transparent platen such as glass, like the first reading window, i.e., the setting surface 3A. The setting surface 3A and the second reading window 3C are partitioned by a partition member 3D having a beam shape.

As shown in FIG. 3, a part which is a boundary part between the setting surface 3A and the second reading window 3C and which faces the reading unit 7 is provided with an adjustment reference (an example of a mark) 55. The adjustment reference 55 is to re-adjust a reference of color and shading at the time of reading and a reference position of the reading unit 7.

Also, the adjustment reference 55 is provided to the partition member 3D. The adjustment reference 55 has a white tape (an example of a white reference plate) 55A and a black tape 55B aligned in a sub-scanning direction, for example. In this exemplary embodiment, a position of the white tape 55A which is read by the reading unit 30 is regarded as a standby position WP. In this exemplary embodiment, the standby position WP is a position at which the reading unit 7 stands by when the reading unit 7 does not execute the FB reading of reading an image of a document set on the setting surface 3A. Also, the standby position WP is a reference position when the reading unit 7 executes a reading scanning. Also, a CPU 20 which will be described later executes the reading while using reading data, which is obtained by reading the white tape 55A, as the reference of the color and shading.

In this exemplary embodiment, as shown in FIG. 3, the ADF reading position RP, the standby position WP, the adjustment reference 55, the reading starting position PS and the reading ending position PE are aligned in order of the ADF reading position RP, the standby position WP, the adjustment reference 55, the reading starting position PS and the reading ending position PE in the A moving direction of the reading unit 7.

As shown in FIG. 3, the document cover 5 is provided with the ADF device 40. The ADF device 40 includes an ADF cover 41, a document tray 42, a feeding path 43, a variety of rollers such as feeding rollers 44, a feeder roller 44A, sheet discharge rollers 45 and the like and a sheet discharge tray 46 using an upper surface of the document tray 5, as shown in FIG. 3. The ADF device 40 is configured to feed documents 5, which are set on the document tray 42, one by one, to convey the document to pass on the second reading window 3C and to discharge the document onto the sheet discharge tray 46. Further, a rear sensor 47 such as photo sensor for detecting the document which is conveyed by the feeding rollers 44 and a front sensor 49 such as photo sensor for detecting the document 5 which is set on the document tray 42 are provided.

In the feeding path 43, the rear sensor 47 is provided at a more upstream side than the reading unit 7 in the document feeding direction. Also, when the documents are plural, a first document and a subsequent document following the first document are set on the document tray 42. Here, the feeding rollers 44, the feeder roller 44A and the sheet discharge rollers 45 correspond to an example of a feeding unit for feeding the document 5.

2. Driving Force Transmission Mechanism 2-1. Configuration of Driving Force Transmission Mechanism In this exemplary embodiment, the moving mechanism 9 and the feeding units 44, 45 are driven by one motor 31. That is, a driving force transmission mechanism 13 selectively transmits a driving force generated by the motor 31, i.e., a motor torque to the moving mechanism 9 or the feeding units 44, 45.

Figure 4:
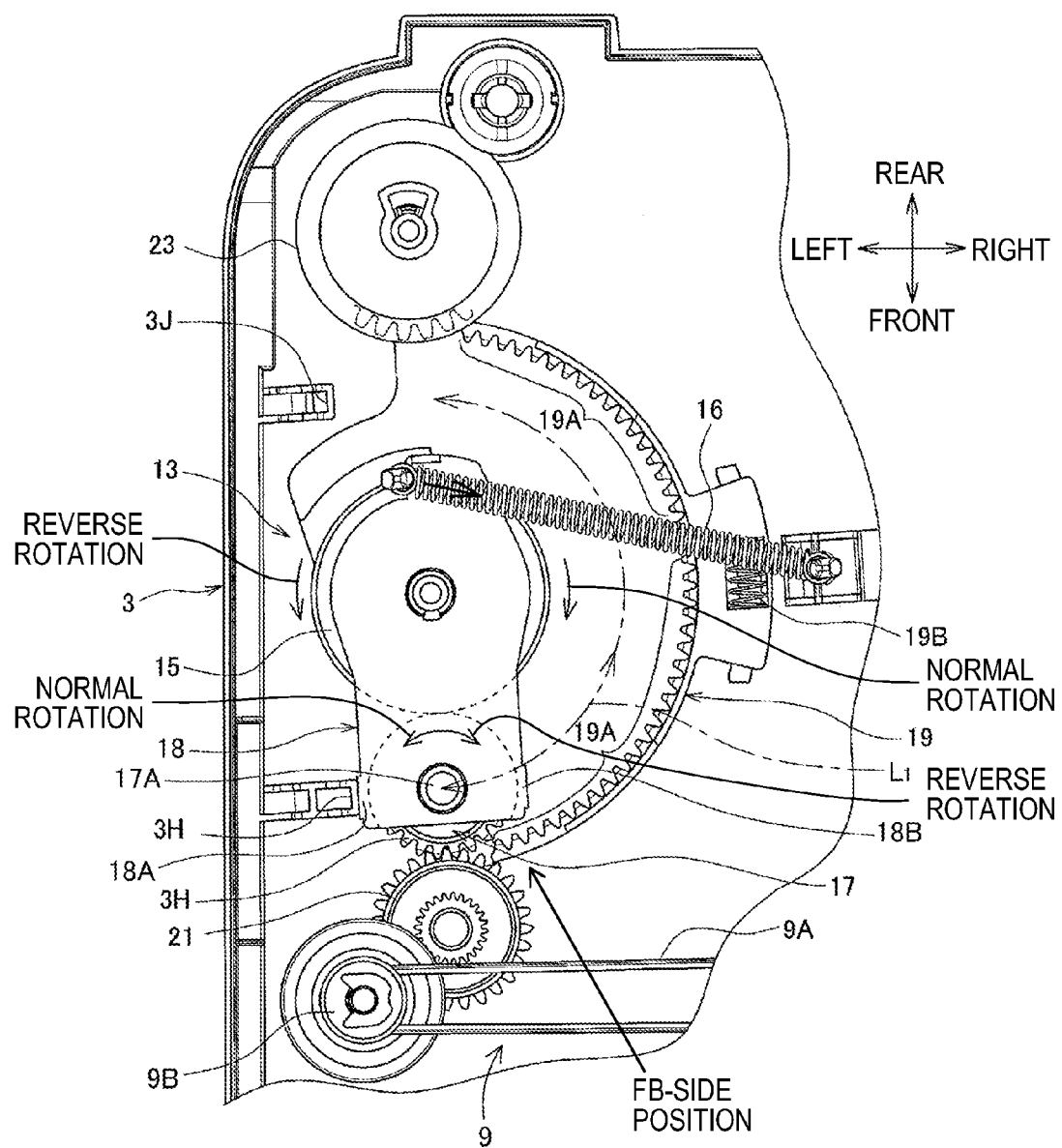
FIG. 4 shows a structure of a driving force transmission mechanism according to the exemplary embodiment of the invention.

As shown in FIG. 4, the driving force transmission mechanism 13 of this exemplary embodiment includes a planet gear mechanism, a carriage-side transmission gear (hereinafter, referred to as 'FB-side transmission gear') 21 and a feeding unit-side transmission gear (hereinafter, referred to as 'ADF-side transmission gear') 23. The planet gear mechanism includes a sun gear (an example of a motor-side transmission gear) 15, a planet gear (an example of a switching gear) 17, a meshing part 19 and the like.

The sun gear 15 transmits power which is fed by the motor 31 to the planet gear 17. The sun gear 15 is rotated without being displaced relative to the document platen 3. The sun gear 15 is rotated by obtaining the driving force from the motor 31 and a rotating direction thereof is a normal rotating direction or a reverse rotating direction in conjunction with the rotating direction of the motor 31. That is, in this exemplary embodiment, the rotating direction of the motor 31 and the rotating direction of the sun gear 15 are the same.

The FB-side transmission gear 21 transmits the power from the motor 31 to the carriage 8 when executing FB reading. In the meantime, the ADF-side transmission gear 23 transmits the power from the motor 31 to the feeding unit when executing ADF reading.

The planet gear 17 is configured to switch between a meshing state with the ADF-side transmission gear 23 at a feeding unit-side position (hereinafter, referred to as 'ADF-side position') where the planet gear 17 couples the sun gear 15 and the ADF-side transmission gear 23 when executing ADF reading and a meshing state with the FB-side transmission gear 21 at a carriage-side position (hereinafter, referred to as 'FB-side position') where the planet gear 17 couples the sun gear 15 and the FB-side transmission gear 21 when executing FB reading. The planet gear 17 is rotated with being meshed with the sun gear 15 and can revolve around the sun gear between the FB-side position shown in FIG. 4 and the ADF-side position shown in FIG. 6 about a rotation center of the sun gear 15 serving as the revolution center. Also, the planet gear 17 rotates about a rotation center 17A.

When the sun gear 15 is rotated, the planet gear 17 is applied with a force (hereinafter, referred to as 'rotating force') of enabling the planet gear 17 to rotate on its own axis and a force (hereinafter, referred to as 'revolving force') of enabling the planet gear 17 to revolve around the sun gear 15. Therefore, when the sun gear 15 is rotated in the normal rotating direction, the revolving force in a direction (a right turn direction in FIG. 4) from the ADF-side position toward the FB-side position is applied to the planet gear 17.

On the other hand, when the sun gear 15 is rotated in the reverse rotating direction, the revolving force in a direction (a left turn direction in FIG. 4) from the FB-side position toward the ADF-side position is applied to the planet gear 17. When the revolving force becomes larger, the planet gear 17 revolves around the sun gear 15 in the direction of the revolving force. On the other hand, when the revolving force is small, the planet gear 17 rotates on its own axis without revolving the sun gear 15.

In the meantime, a direction in which the planet gear 17 rotates on its own axis while the sun gear 15 is rotated in the normal rotating direction is referred to as a normal rotating direction of the planet gear 17. Likewise, a direction in which the planet gear 17 rotates on its own axis while the sun gear 15 is rotated in the reverse rotating direction is referred to as a reverse rotating direction of the planet gear 17. As shown in FIG. 4, the respective rotating directions of the sun gear 15 are opposite to the respective rotating directions of the planet gear 17.

An arm (an example of a support member) 18 supports the planet gear 17 such that the planet gear 17 can rotate on its own axis and revolve around the sun gear 15. One end of the arm 18 in an extending direction thereof is rotatably supported on the same axis as the sun gear 15. The planet gear 17 is rotatably mounted to the other end of the arm 18 in the extending direction.

Also, the document platen 3 is provided with a second stopper part 3H and a third stopper part 3J which are configured to regulate a rotation of the arm 18. In the meantime, the arm 18 is provided with a second contact part 18A configured to contact the second stopper part 3H and a third contact part 18B configured to contact the third stopper part 3J.

Figure 6:
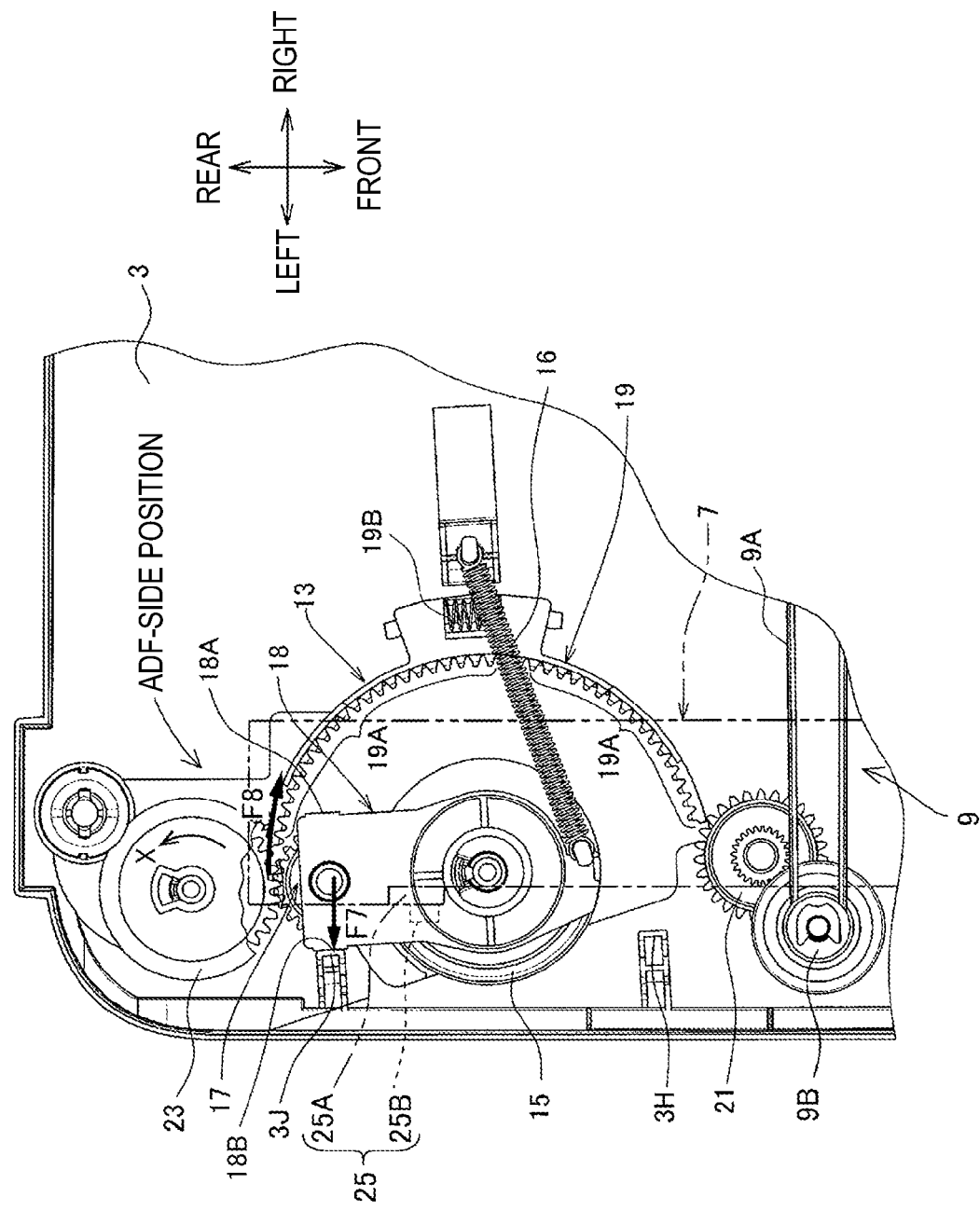
FIG. 6 illustrates a case where the planet gear is located at an ADF-side position.

As shown in FIG. 4, when the planet gear 17 is located at the FB-side position, the second stopper part 3H is contacted to the second contact part 18A to thus regulate the rotation of the arm 18 in a right turn direction of the drawing sheet. Meanwhile, as shown in FIG. 6, when the planet gear 17 is located at the ADF-side position, the third stopper part 3J is contacted to the third contact part 18B to thus regulate the rotation of the arm 18 in a left turn direction of the drawing sheet.

Also, a first spring (an example of a restraint member) 16 restrains the switching of the planet gear 17 when the planet gear 17 is located at the FB-side position (hereinafter, referred to as 'at the time of FB-side position') or when the planet gear 17 is located at the ADF-side position (hereinafter, referred to as 'at the time of ADF-side position'). That is, when executing the FB reading, the first spring 16 restrains the planet gear 17 from being separated from the FB-side transmission gear 21 when the sun gear 15 is rotated in the reverse rotating direction. That is, at least at the time of FB-side position, the first spring 16 applies a force (hereinafter, referred to as a first restraint force) of restraining the planet gear 17 from revolving around the sun gear toward the ADF-side position to the planet gear 17.

In the meantime, the first spring 16 of this exemplary embodiment is a tension coil spring. One end of the first spring 16 in an extending direction thereof is connected to the opposite side of the arm 18 to the planet gear 17 with a rotation center of the arm 18 being interposed therebetween. The other end of the first spring 16 in the extending direction is connected to the document platen (an example of a fixing part) 3.

Therefore, at the time of ADF-side position, the first spring 16 applies a force (hereinafter, referred to as a second restraint force) of restraining the planet gear 17 from revolving around the sun gear 15 toward the FB-side position to the arm 18.

When the planet gear 17 is located at the ADF-side position, the driving force is transmitted to the feeding units 44, 45 and the sun gear 15 is rotated in the reverse rotating direction, as described below. When the sun gear 15 is rotated in the reverse rotating direction, the force of enabling the planet gear 17 to revolve around the sun gear 15 from the FB-side position to the ADF-side position is applied to the planet gear 17.

Hence, in this exemplary embodiment, while the driving force is transmitted at least to the feeding units, i.e., while the sun gear 15 is rotated in the reverse rotating direction, the planet gear 17 keeps staying at the ADF-side position even though the second restraint force is not applied.

Therefore, in this exemplary embodiment, the first restraint force of restraining the revolution, which is applied to the planet gear 17 by the first spring 16 at the time of FB-side position, is made to be larger than the second restraint force of restraining the revolution, which is applied to the planet gear 17 by the first spring 16 at the time of ADF-side position.

Specifically, the positions of the one end and the other end in the extending direction are set such that an amount of deformation of the first spring 16 at the time of FB-side position is larger than an amount of deformation of the first spring 16 at the time of ADF-side position.

The meshing part 19 is meshed with teeth of the planet gear 17 when the planet gear 17 revolves around the sun gear 15 between the FB-side position and the ADF-side position. In this exemplary embodiment, the meshing part 19 is configured by an internal teeth gear.

As shown in FIG. 4, the meshing part 19 is a type of a gear having a plurality of protrusions 19A which protrudes toward the sun gear 15 and is provided along a revolution path L1 of the planet gear 17.

The meshing part 19 is mounted to the document platen 3 to be movable relative to the sun gear 15. In the meantime, the meshing part 19 of this exemplary embodiment can be displaced along the revolution path L1 of the planet gear 17 around the sun gear 15. A second spring 19B is provided which returns the meshing part 19 to a position before movement when the meshing part 19 is moved.

The ADF-side transmission gear 23 is arranged at a side of a hinge mechanism 5A than the FB-side transmission gear 21 in a direction (front-rear direction, in this exemplary embodiment) orthogonal to the moving direction of the reading unit 7 of directions parallel to the setting surface 3A. The ADF-side transmission gear 23 is rotatable in one direction only. That is, the ADF-side transmission gear 23 has a reverse rotation preventing mechanism which allows a rotation of the ADF-side transmission gear 23 in an X direction (refer to FIG. 6) only, in which the feeding units feed the document and prevents the rotation in an opposite direction thereto. The reverse rotation preventing mechanism has a known reverse rotation preventing claw (not shown), for example.

That is, as shown in FIG. 4, the FB-side transmission gear 21 is arranged at an opposite side to the ADF-side transmission gear 23 with the sun gear 15 being interposed therebetween. The rotary shaft directions of the sun gear 15, the planet gear 17, the FB-side transmission gear 21 and the ADF-side transmission gear 23 are orthogonal to the setting surface 3A.

Also, as shown in FIG. 4, the FB-side transmission gear 21 is meshed with the planet gear 17 when the planet gear 17 is located at the FB-side position. Hence, at the time of FB-side position, the driving force is transmitted in order of the sun gear 15, the planet gear 17 and the FB-side transmission gear 21. The first toothed pulley 9B is driven by the FB-side transmission gear 21, so that the moving mechanism 9 is driven.

On one hand, when the sun gear 15 is rotated in the normal rotating direction, the moving mechanism 9 moves the carriage 8, i.e., the reading unit 9 in the A direction of FIG. 3. On the other hand, when the sun gear 15 is rotated in the reverse rotating direction, the moving mechanism 9 moves the reading unit 9 in the B direction of FIG. 3. That is, the reading unit 7 is moved in correspondence to the rotating direction of the sun gear 15.

As shown in FIG. 6, the ADF-side transmission gear 23 is meshed with the planet gear 17 when the planet gear 17 is located at the ADF-side position. Hence, at the time of ADF-side position, the driving force is transmitted in order of the sun gear 15, the planet gear 17 and the ADF-side transmission gear 21, so that the feeding units 44, 45 are driven.

As shown in FIG. 2, a load generation unit (an example of a load member) 25 which increases a rotational resistance of the FB-side transmission gear 21 is provided. The load generation unit 25 increases the rotational resistance of the FB-side transmission gear 21 when the reading unit 7 is located at the ADF reading position RP, compared to a case where the reading unit is located at a position other than the ADF reading position RP.

Figure 5:
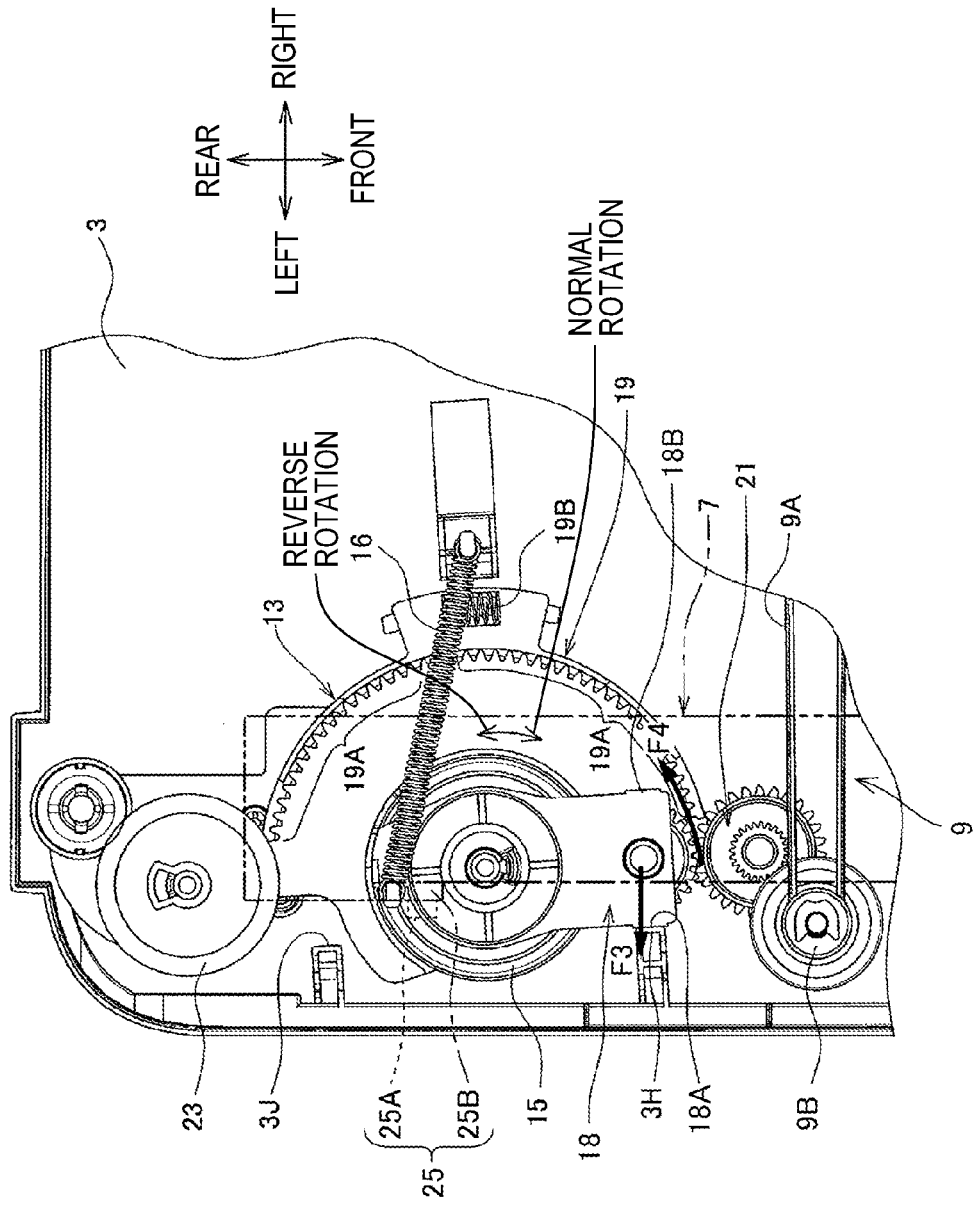
FIG. 5 illustrates a case where a planet gear is located at an FB-side position.

That is, in this exemplary embodiment, the load generation unit 25 includes the first contact part 25A which is provided to the reading unit 7 and the first stopper part 25B which is provided to the document platen 3. The first contact part 25A and the first stopper part 25B are contacted to each other, as shown in FIG. 5.

Therefore, when the reading unit 7 is located at the ADF reading position RP and the first contact part 25A and the first stopper part 25B are thus contacted each other while the sun gear 15 is rotated in the reverse rotating direction, the reading unit 7 is restrained from moving. As a result, the rotational resistance of the FB-side transmission gear 21 is increased.

3. Operations of Driving Force Transmission Mechanism 3.1 When executing FB reading When the image reading apparatus 1 does not operate, the reading unit 7 is located at the standby position WP and the planet gear 17 is located at the FB-side position. For example, when a user operates a reading start button 11A to thereby start the FB reading, a CPU 20 rotates the motor 31 in the normal rotating direction to thus rotate the sun gear 15 in the normal rotating direction.

Thereby, the reading unit 7 is moved from the standby position WP toward the reading ending position PE. At this time, the planet gear 17 is applied with the revolving force in the direction from the ADF-side position toward the FB-side position. However, since the second stopper part 3H and the second contact part 18A are contacted to each other, the planet gear 17 does not revolve around the sun gear 15 and rotates on its own axis in the normal rotating direction with being still at the FB-side position.

When a number of driving steps of the motor 31 reaches a predetermined value, the CPU 20 (refer to FIG. 7) rotates the motor 31 in the reverse rotating direction to thus rotate the sun gear 15 in the reverse rotating direction. Also, when it is determined that the reading unit 7 reaches the standby position WP, the CPU 20 stops the motor 31. Thereby, the reading unit 7 is moved from the reading ending position PE to the standby position WP.

When the sun gear 15 is rotated in the reverse rotating direction, the planet gear 17 is applied with the revolving force in the direction from the FB-side position toward the ADF-side position, i.e., the revolving force enabling the planet gear 17 to separate from the FB-side transmission gear 21. However, since the revolving force is canceled out by the first spring 16, the planet gear 17 does not revolve around the sun gear 15 and rotates on its own axis in the reverse rotating direction with being still at the FB-side position.

3.2 When Executing ADF Reading

When the image reading apparatus 1 does not operate, the reading unit 7 is located at the standby position WP and the planet gear 17 is located at the FB-side position. For example, when a user operates the reading start button 11A to start the ADF reading, the CPU 20 rotates the motor 31 in the reverse rotating direction to thus rotate the sun gear 15 in the reverse rotating direction.

The reading unit 7, i.e., the carriage 8 is moved from the standby position WP toward the ADF reading position RP, as shown in FIG. 5. When the reading unit 7 is located at the feeding reading position RP and the first stopper part 25B and the first contact part 25A are thus contacted each other, the reading unit 7 is restrained from moving, so that the rotational resistance of the FB-side transmission gear 21 is increased.

Therefore, the rotating of the planet gear 17 on its own axis is disturbed, so that the rotating force thereof is reduced. In the meantime, the revolving force is increased in the direction along which the planet gear 17 revolves around the sun gear 15 from the FB-side position to the ADF-side position. When the corresponding revolving force exceeds the first restraint force of the first spring 16, the planet gear 17 and the meshing part 19 are meshed each other, so that the planet gear 17 starts to revolve around the sun gear toward the ADF-side position.

When the planet gear 17 revolves around the sun gear 15 and the third stopper part 3J and the third contact part 18B are thus contacted each other, the revolution of the planet gear 17 around the sun gear is stopped and the planet gear 17 and the ADF-side transmission gear 23 are meshed each other, as shown in FIG. 6. Hence, the driving force is transmitted to the feeding units, so that the feeding of the document starts.

When it is determined that the ADF reading is over, the CPU 20 rotates the motor 31 in the normal rotating direction to thus rotate the sun gear 15 in the normal rotating direction. Thereby, the planet gear 17 is applied with the revolving force in the direction from the ADF-side position toward the FB-side position.

When the corresponding revolving force exceeds the second restraint force of the first spring 16, the planet gear 17 revolves around the sun gear toward the FB-side position. When the planet gear 17 is located at the FB-side position, the planet gear 17 and the FB-side transmission gear 21 are meshed each other, so that the reading unit 7 is moved in the A direction of FIG. 2 from the ADF reading position RP.

4. Electrical Configuration of Image Reading Apparatus

Figure 7:
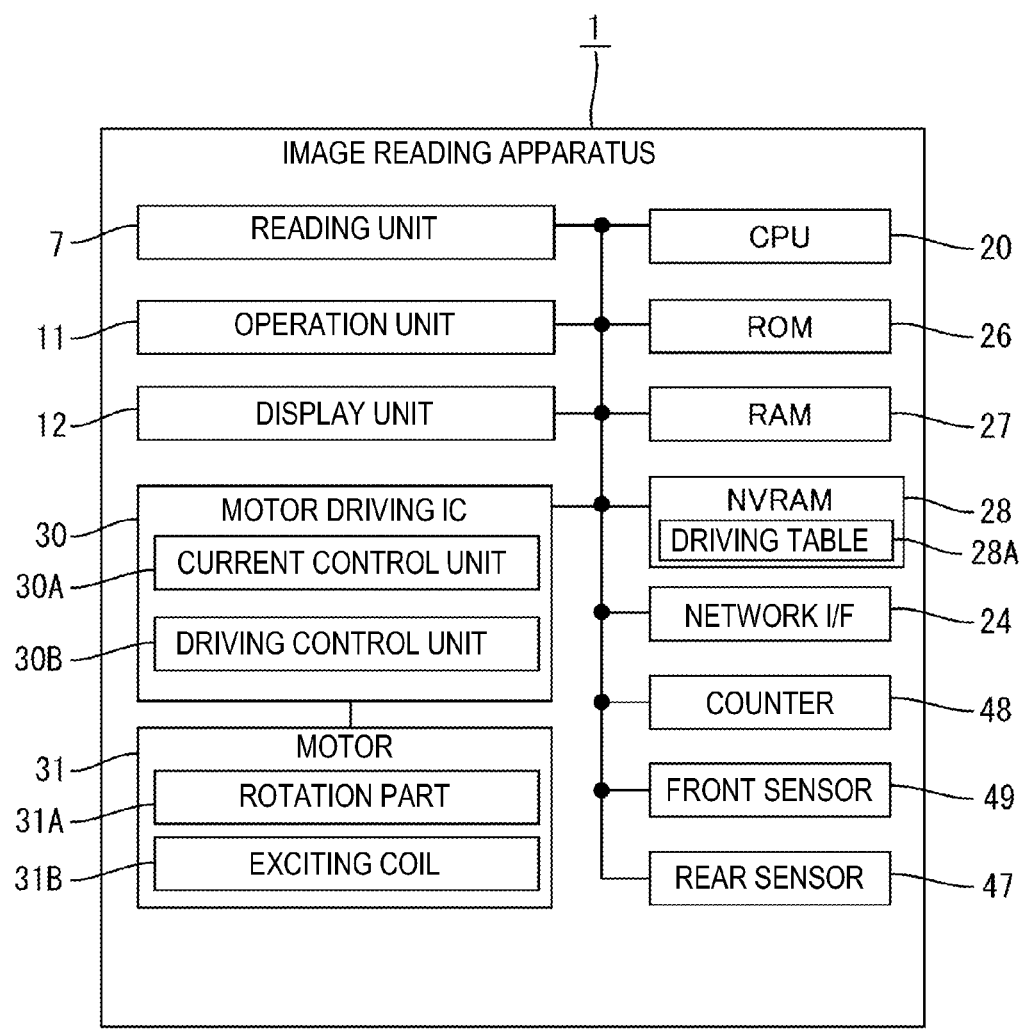
FIG. 7 is a block diagram schematically showing an electrical configuration of the image reading apparatus.
Figure 9:
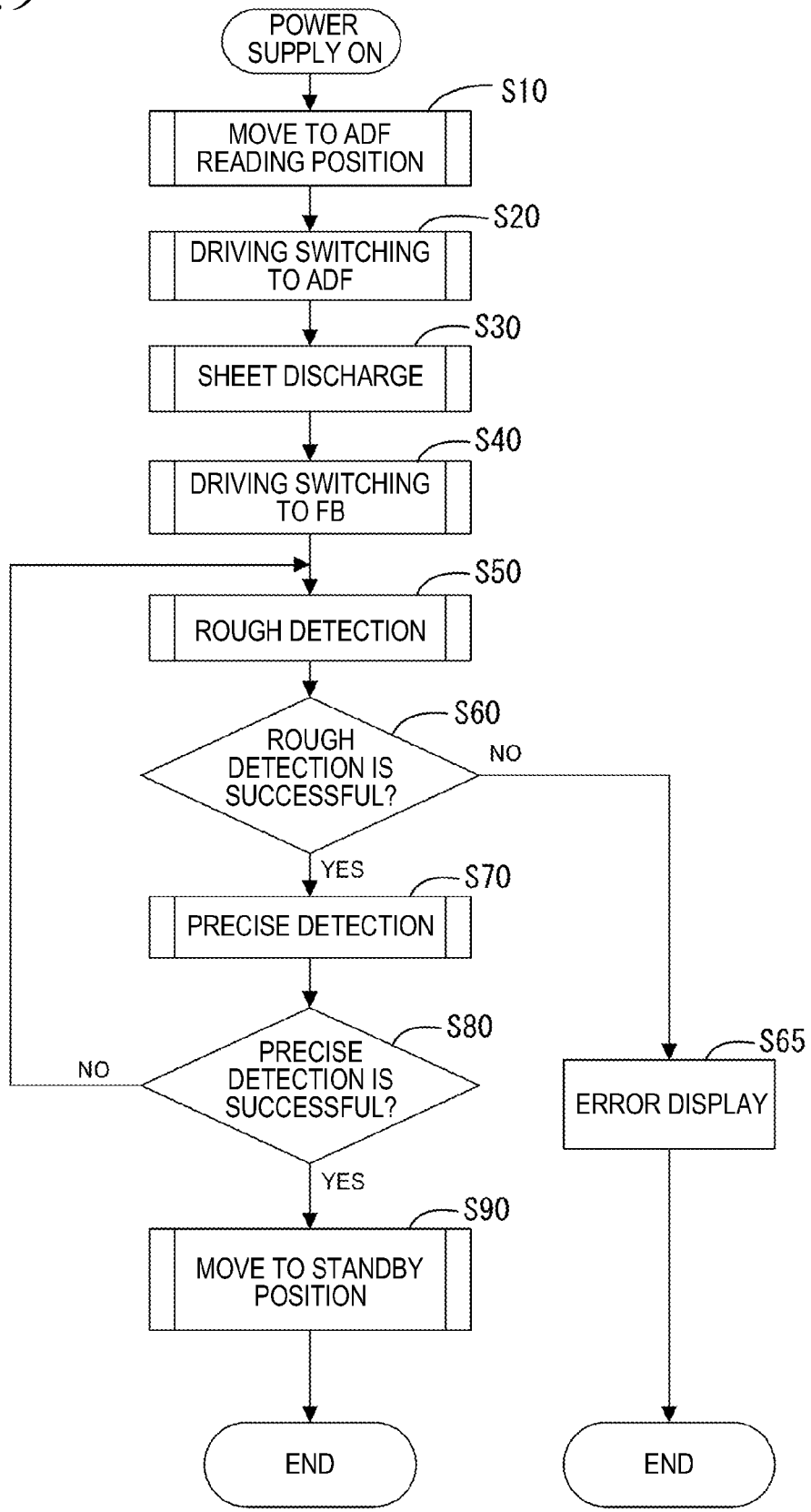

As shown in FIG. 7, the image reading apparatus 1 has the CPU 20 (an example of a motor control unit and a determination unit), a ROM 26, a RAM 27, an NVRAM (non-volatile RAM) 28 and a network interface 24, to which the reading unit 30, the operation unit 11, the display unit 12, a counter 48, the rear sensor 47, the front sensor 49, a motor driving IC 30 and the like are connected. The motor driving IC 30 is connected with the motor 31.

The network interface 24 is connected to an external computer and the like via a communication line (not shown). Data communication can be performed through the network interface 24. In the meantime, it is also possible to receive a reading starting instruction from the external computer through the network interface 24.

The ROM 26 stores therein a variety of programs for controlling operations of the image reading apparatus 1. The CPU 20 stores a processing result in the RAM 27 or NVRAM 28 and controls the respective units according to the program read from the ROM 26. Also, the ROM (an example of a storage unit) 26 stores therein the number of steps for stepwise driving of the motor 31, and the like. Also, the NVRAM 28 stores therein a driving table 28A indicating driving conditions relating to respective torques of the motor 31 (which will be described later).

The motor 31 is a two-phase stepping motor and includes a rotation part 31A which rotates about a predetermined shaft and a plurality of exciting coils (an example of a driving parts) 31B which interact with the rotation part 31A to thus rotate the rotation part 31A as a current is applied thereto.

Also, the motor driving IC 30 is controlled by the CPU 20 and includes a current control unit 30A and a driving control unit 30B. The current control unit 30A controls an amount of the current which is applied to the respective exciting coils 31B. Also, the driving control unit 30B controls a driving speed at which the respective exciting coils 31B are driven.

The CPU 20 controls the motor driving IC 30 to control the current control unit 30A to increase the amount of the current, which is applied to the exciting coils 31B, thereby increasing the motor torque. That is, the amount of the current to be applied to the exciting coils 31B is proportional to the motor torque, so that it is possible to securely increase the motor torque by increasing the amount of the current.

The CPU 20 controls the motor driving IC 30 to control the driving control unit 30B to lower the driving speed of the exciting coils 31B, thereby increasing the motor torque. That is, the driving speed of the exciting coils 31B is inversely proportional to the motor torque, so that it is possible to securely increase the motor torque by lowering the driving speed of the exciting coils 31B.

5. Rotation Control of Motor

In the below, a rotation control of the motor 31 relating to respective processing of the reading is described with reference to FIGS. 8 to 17. In the rotation control of the motor 31 of this exemplary embodiment, the torque of the motor 31 is varied in each processing, based on the driving table shown in FIG. 8.

5-1. Driving Table

In the driving table 28A shown in FIG. 8, a driving current value, an excitation method and a rotating speed are stored as the motor driving conditions.

Here, a duty ratio (%) of a motor driving signal is stored as the current value. In this exemplary embodiment, the motor 31 is a two-phase stepping motor and '2-2 phase', 'w1-2 phase' and '2w1-2 phase' are used as the excitation method.

Also, the rotating speed (rpm) is equal to (driving frequency (pps)/the number of motor divisions)×60 (m/s). Here, the number of motor divisions is the same as the number of magnets in the motor. When a driving pulse of the number of motor divisions is supplied to the motor 31 by the excitation method '2-2 phase', the motor 31 rotates one revolution. Here, the number of motor divisions is '48', for example.

As the driving current value is larger, the torque of the motor 31 is increased. Also, as the rotating speed is slower, the torque of the motor 31 is increased. As the number of pulses which are supplied to the motor 31 per second is decreased, i.e., as the frequency of the driving pulse is lower, the rotating speed is slower, so that the torque of the motor 31 is increased. Also, the excitation method is changed in order of '2w1-2 phase', 'w1-2 phase' and '2-2 phase', so that a step angle of the motor 31 is increased in this order and the torque is thus increased in this order.

In the below, the rotation control of the motor 31 which is performed in the respective operations of the image reading apparatus 1 is described.

5-2. Power Supply On

First, the rotation control of the motor 31 relating to the respective processing, which is performed when the power supply is on, is described with reference to FIGS. 8 to 15. In the meantime, each rotation control is executed by the CPU 20, based on a predetermined program stored in the ROM 26, when the user operates the power supply switch 11B and the power supply of the image reading apparatus 1 is thus on.

At the time when the power supply of the image reading apparatus 1 is on, a position of the reading unit 7, i.e., the carriage 8 is not determined Hence, when the power supply of the image reading apparatus 1 becomes on, the CPU 20 first moves the carriage 8 to the ADF reading position RP (step S10). The motor rotation control in this processing is described with reference to FIG. 10.

Figure 10:
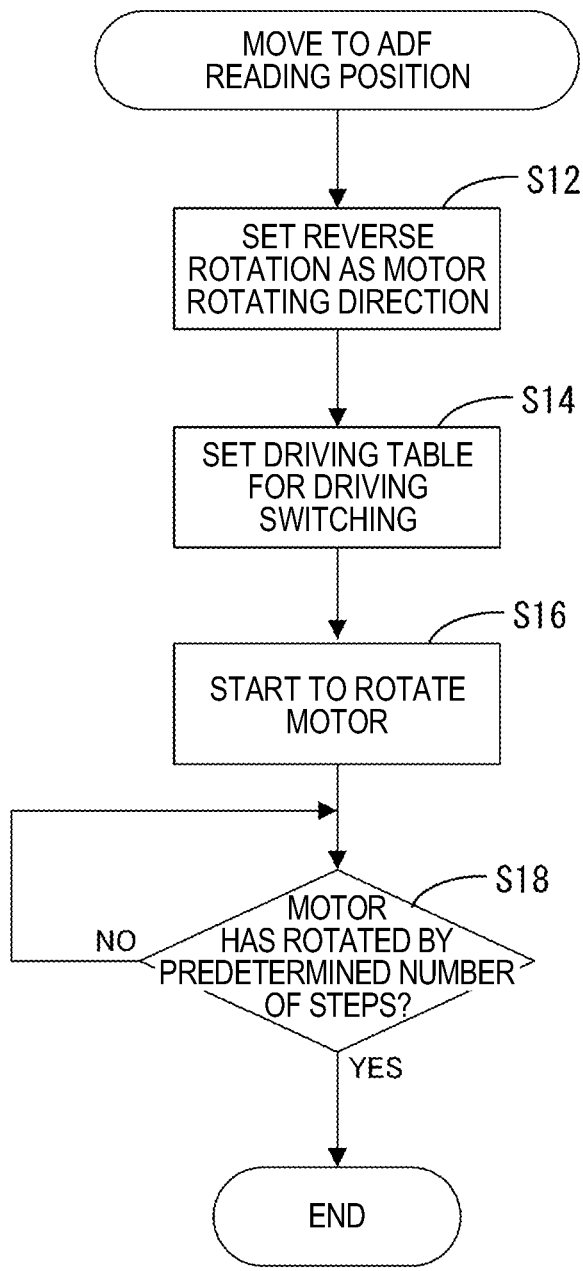

In FIG. 10, the CPU 20 first sets, as the motor rotating direction, the 'reverse rotation' (step S12). Then, the CPU 20 sets a 'driving switching table TB1' in the motor driving table 28A, which is a driving table for driving switching (step S14). Thereby, the current value is set as 80(%), the excitation method is set as '2-2 phase' and the rotating speed is set as 547.1 (rpm). The motor 31 is driven in accordance with the settings, so that motor torque TR1 becomes 'large.'

Here, a magnitude of the motor torque TR1 (an example of a switching torque) in the driving table 'driving switching table TB1' is described.

When switching the planet gear 17 from the FB-side position to the ADF-side position, the planet gear 17 is applied with the forces as follows:

'1' revolving force F1 of the planet gear 17 by the reverse rotation of the sun gear 15;

'2' rotating force F2 of the planet gear 17 by the reverse rotation of the sun gear 15;

'3' revolution restraining force (first restraint force) F3 of the planet gear 17 by the first spring 16 (refer to FIG. 5); and '4' reaction force F4 which is applied from the FB-side transmission gear 21 by the rotating force F2 (refer to FIG. 5).

Here, the revolution restraining force of the planet gear 17 by the first spring 16 is a force which is applied to the planet gear 17 by a moment which is generated by the first spring 16.

When a relation of F4>F3 (inequality expression 1) is satisfied, it is possible to separate the planet gear 17 from the FB-side transmission gear 21 and to enable the planet gear 17 to mesh with the meshing part 19. Hence, the motor torque TR1 in the driving table 'driving switching table TB1' is experimentally determined in advance so that it satisfies the inequality expression 1.

The reaction force F4 is generated by the rotational resistance of the FB-side transmission gear 21, which is caused by the load generation unit 25. That is, the FB-side transmission gear 21 is in a state where it cannot almost rotate by the load generation unit 25. Thus, when the planet gear 17 intends to rotate on its own axis, the planet gear 17 is applied with the reaction force F4 from the FB-side transmission gear 21, which is the substantially opposite direction to the rotating force F2.

That is, when switching the planet gear 17, the reaction force F4 is applied to the planet gear 17 from the FB-side transmission gear 21 under rotation-restrained state. Thereby, it is possible to appropriately switch the planet gear 17 from the FB-side position to the ADF-side position while the rotation of the planet gear 17 does not step out from the rotation of the motor 31.

Subsequently, the CPU 20 controls the respective units in accordance with the 'driving switching table TB1', and starts to rotate the motor 31 (step S16: an example of a large torque control). Then, the CPU 20 determines whether the motor 31 has rotated by a predetermined number of steps SN1, based on a count value of the counter 48 (step S18). When it is determined that the motor 31 has rotated by the predetermined number of steps SN1 (step S18:YES), the CPU 20 ends the processing of step S10 while assuming that the carriage 8 has reached the ADF reading position RP. On the other hand, when it is determined that the motor 31 has not rotated by the predetermined number of steps SN1 (step S18: NO), the CPU 20 rotates the motor 31 until the motor 31 rotates by the predetermined number of steps SN1, while assuming that the carriage 8 has not yet reached the ADF reading position RP.

In the meantime, the predetermined number of steps SN1 is the number of steps capable of moving the carriage 8 in the B direction of FIG. 3 as possible and is stored in the ROM 26. By the predetermined number of steps SN1, it is possible to securely move the carriage 8 whose position is not constant when the power supply is on to the ADF reading position RP. Also, the predetermined number of steps SN1 is an example of a predetermined condition.

Subsequently, the CPU 20 performs driving switching processing of switching the planet gear 17 from the FB-side position to the ADF-side position (step S20). The motor rotation control of this processing is described with reference to FIG. 11.

Figure 11:
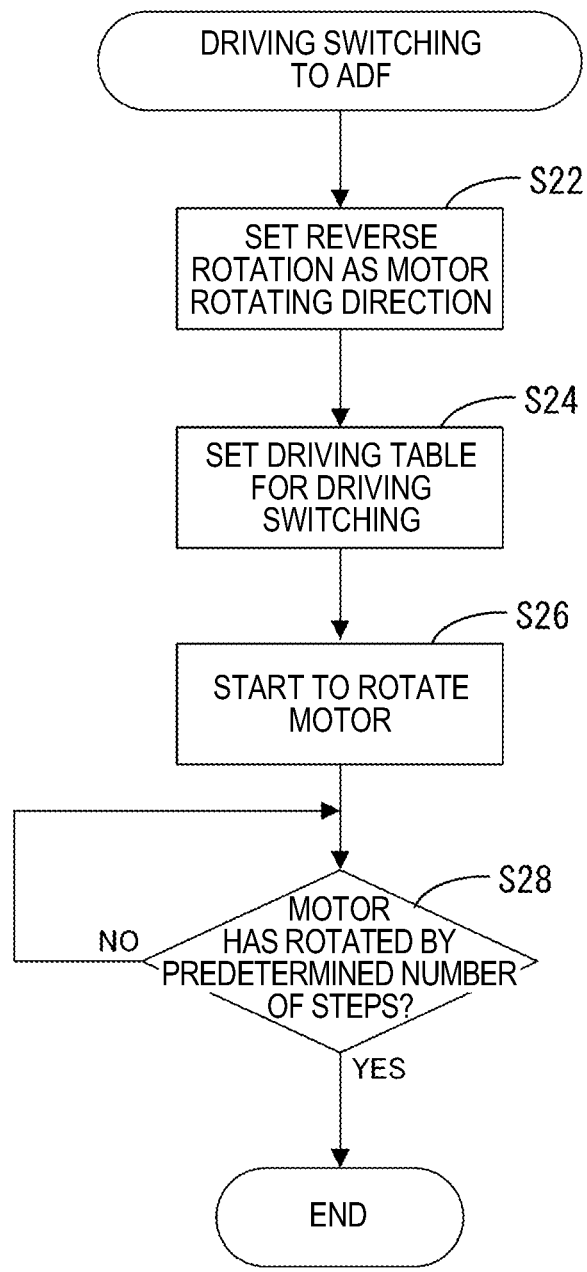

In FIG. 11, the CPU 20 first sets, as the motor rotating direction, the 'reverse rotation' (step S22). Then, the CPU 20 sets the 'driving switching table TB1', similarly to the processing of moving the carriage 8 to the ADF reading position RP (step S24).

Subsequently, the CPU 20 controls the respective units in accordance with the 'driving switching table TB1', and starts to rotate the motor 31 (step S26: an example of a large torque control). Then, the CPU 20 determines whether the motor 31 has rotated by a predetermined number of steps SN2, based on a count value of the counter 48 (step S28). When it is determined that the motor 31 has rotated by the predetermined number of steps SN2 (step S28:YES), the CPU 20 ends the processing of step S20 while assuming that the planet gear 17 is separated from the FB-side transmission gear 21 and is meshed with the ADF-side transmission gear 23, i.e., the planet gear 17 is switched from the FB-side position to the ADF-side position. On the other hand, when it is determined that the motor 31 has not rotated by the predetermined number of steps SN2 (step S28: NO), the CPU 20 rotates the motor 31 until the motor 31 rotates by the predetermined number of steps SN2, while assuming that the planet gear 17 is not switched from the FB-side position to the ADF-side position.

In the meantime, the predetermined number of steps SN2 is the number of steps after the planet gear 17 is separated from the FB-side transmission gear 21 until is is meshed with the ADF-side transmission gear 23, and is stored in the ROM 26.

Subsequently, the CPU 20 performs sheet discharge processing (step S30). In the motor rotation control in this processing, the motor 31 is rotated in the reverse rotating direction, as described above. Also, although not shown in the driving table, since the torque is not necessary at the switching of the planet gear 17, the motor torque is changed to be lower than the motor torque at the time of driving switching processing of step S20, i.e., by the 'driving switching table TB1.'

Figure 12:
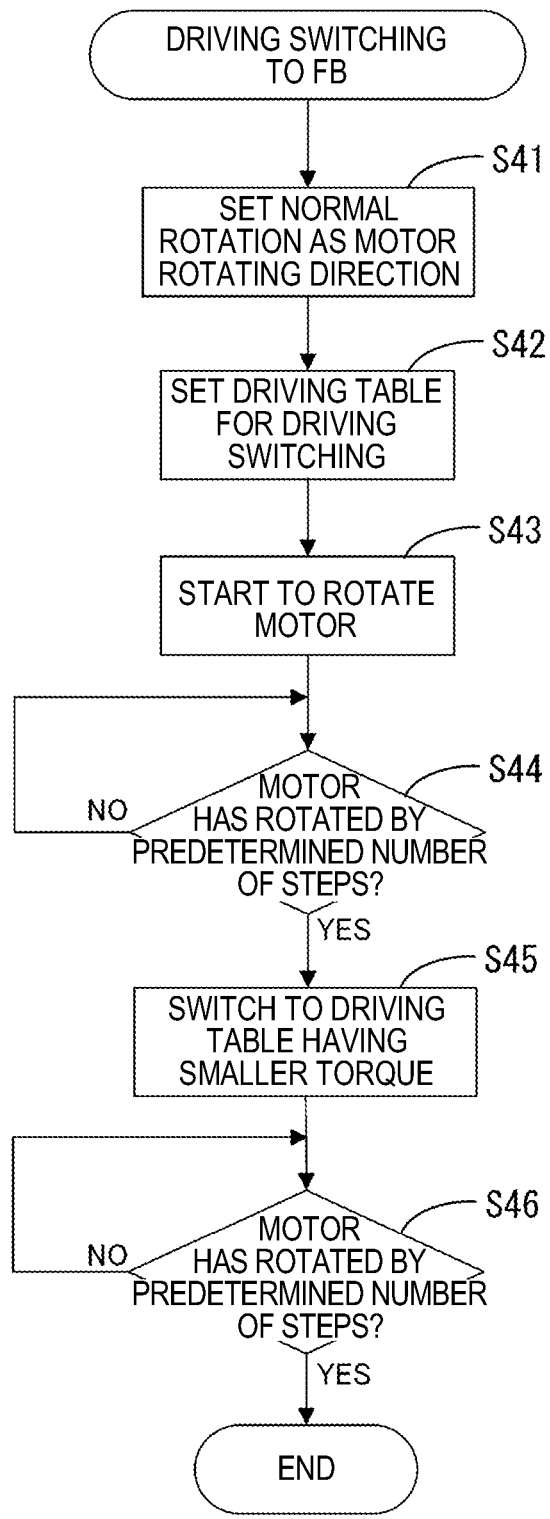

Subsequently, the CPU 20 performs driving switching processing of switching the planet gear 17 from the ADF-side position to the FB-side position (step S40). The motor rotation control in this processing is shown in FIG. 12. In the motor rotation control, the CPU 20 sets, as the motor rotating direction, the 'normal rotation' (step S41) and sets, as the driving table, the 'driving switching table TB1' (step S42).

Subsequently, the CPU 20 controls the respective units in accordance with the 'driving switching table TB1', and starts to rotate the motor 31 (step S43: an example of a large torque control).

Here, a magnitude of the motor torque TR1 in the driving table 'driving switching table TB1' is described.

When switching the planet gear 17 from the ADF-side position to the FB-side position, the planet gear 17 is applied with the forces as follows:

'1' revolving force F5 of the planet gear 17 by the normal rotation of the sun gear 15;

'2' rotating force F6 of the planet gear 17 by the normal rotation of the sun gear 15;

'3' revolution restraining force (second restraint force) F7 of the planet gear 17 by the first spring 16 (refer to FIG. 6); and '4' reaction force F8 which is applied from the ADF-side transmission gear 23 by the rotating force F6 (refer to FIG. 6).

When a relation of F8>F7 (inequality expression 2) is satisfied, it is possible to separate the planet gear 17 from the ADF-side transmission gear 22 and to enable the planet gear 17 to mesh with the meshing part 19. Hence, the motor torque TR1 in the driving table 'driving switching table TB1' is experimentally determined in advance so that it satisfies the inequality expression 2.

In this exemplary embodiment, the respective setting values of the driving table 'driving switching table TB1' are the same in the case where the planet gear 17 is switched from the ADF-side position to the FB-side position and in the case where planet gear 17 is switched from the FB-side position to the ADF-side position. However, the invention is not limited thereto. For example, the respective setting values may be changed such that the motor torque becomes smaller in the case where the planet gear 17 is switched from the ADF-side position to the FB-side position than in the case where planet gear 17 is switched from the FB-side position to the ADF-side position.

In the meantime, the reaction force F8 is generated since the ADF-side transmission gear 23 can be rotated in the X direction only by the reverse rotation preventing claw. That is, since the ADF-side transmission gear 23 cannot be rotated in the opposite direction to the X direction, when the planet gear 17 intends to rotate on its own axis, the planet gear 17 is applied with the repulsive force F8 in the substantially opposite direction to the rotating force F6 from the ADF-side transmission gear 23.

Meanwhile, in this exemplary embodiment, the motor torque TR1 by the 'driving switching table TB1', a maximum value F7max of the torque of the restraint force F7, a minimum value F7min of the torque of the restraint force F7, the reaction force F4 which is applied from the FB-side transmission gear 21 by the rotating force F2 and the reaction force F8 which is applied from the ADF-side transmission gear 23 by the rotating force F6 have a relation as follows:

$$TR1 > F7max > F7min > F4, F8 \qquad \text{inequality expression 3}$$

That is, when switching the planet gear 17, the reaction force F8 is applied to the planet gear 17 from the ADF-side transmission gear 23 under rotation-restrained state. Thereby, it is possible to appropriately switch the planet gear 17 from the ADF-side position to the FB-side position while the rotation of the planet gear 17 does not step out from the rotation of the motor 31.

Subsequently, the CPU 20 determines whether the motor 31 has rotated by a predetermined number of steps SN3, based on a count value of the counter 48 (step S44). Here, the predetermined number of steps SN3 is the number of steps after the planet gear 17 is separated from the ADF-side transmission gear 23 until it is meshed with the FB-side transmission gear 21 and the carriage 8 is moved to the position of the white tape 55A in the A direction, and is stored in the ROM 26.

When it is determined that the motor 31 has rotated by the predetermined number of steps SN3 (step S44: YES (an example of a predetermined condition)), the CPU 20 switches the driving table to a driving table having a torque smaller than the 'driving switching table TB1' while assuming that the carriage 8 is moved to the position of the white tape 55A in the A direction (step S45: an example of a small torque control). On the other hand, when it is determined that the motor 31 has not rotated by the predetermined number of steps SN3 (step S44: NO), the CPU 20 rotates the motor 31 until the motor 31 rotates by the predetermined number of steps SN3, while assuming that the carriage 8 has not been moved to the position of the white tape 55A in the A direction.

Further, the CPU 20 rotates the motor 31 in the normal rotating direction by a predetermined number of steps SN4. The predetermined number of steps SN4 is the number of steps by which the carriage 8 is further moved from the position of the white tape 55A to a predetermined position in the A direction, and is stored in the ROM 26.

Subsequently, the CPU 20 determines whether the motor 31 has rotated by the predetermined number of steps SN4, based on a count value of the counter 48 (step S46). When it is determined that the motor 31 has rotated by the predetermined number of steps SN4 (step S46: YES), the CPU 20 ends the switching processing of step S40 while assuming that the carriage 8 has been further moved from the position of the white tape 55A to a predetermined position in the A direction. On the other hand, when it is determined that the motor 31 has not rotated by the predetermined number of steps SN4 (step S46: NO), the CPU 20 rotates the motor 31 until the motor 31 rotates by the predetermined number of steps SN4, while assuming that the carriage 8 has not been moved to the predetermined position.

In the meantime, instead of the processing of step S44, the CPU 40 may determine whether the white tape 55A is detected, based on detection data of the reading unit 7, and may switch the driving table to a driving table having a smaller motor torque (an example of a small torque control) when it is determined that the white tape 55A is detected (an example of a predetermined condition).

Also, in the driving switching processing shown in FIG. 12, the processing of steps S45 and S46 may be omitted. That is, the motor torque may not be changed.

Subsequently, the CPU 20 performs a rough detection processing (step S50). In the rough detection processing, a rough detection determining whether the carriage 8 is in the vicinity of a black-white boundary BP, which is a boundary of the white tape 55A and the black tape 55B, is performed. The motor rotation control in the rough detection processing is described with reference to FIG. 13.

Figure 13:
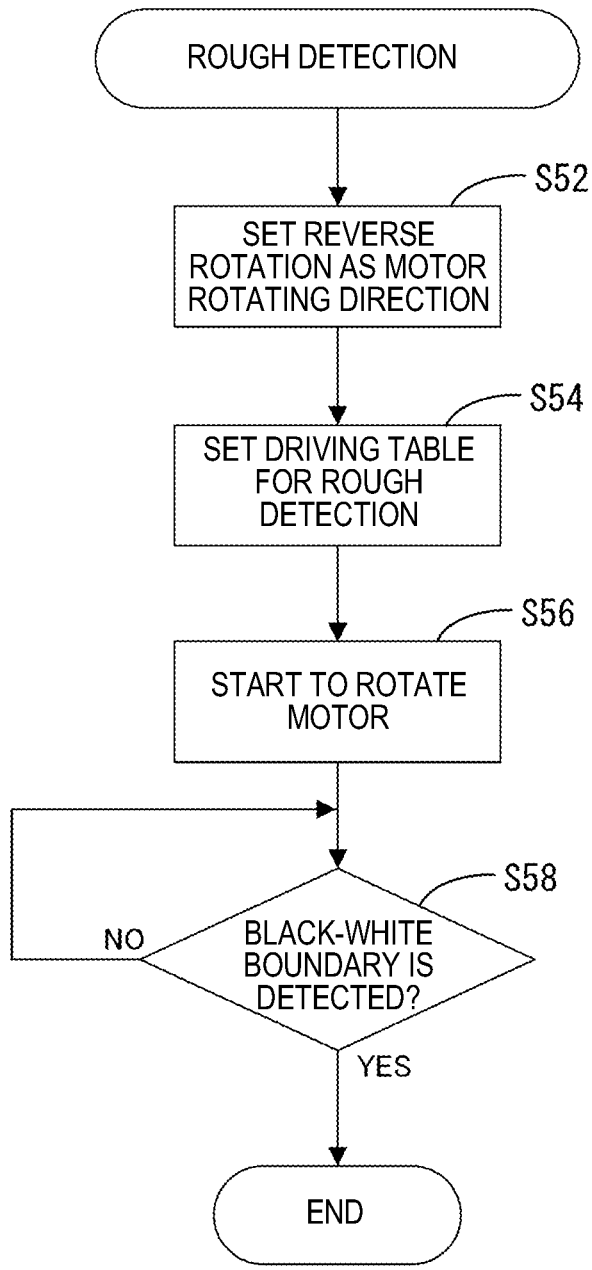

In FIG. 13, the CPU 20 first sets, as the motor rotating direction, the 'reverse rotation' (step S52). Then, the CPU 20 sets, as the driving table, a 'rough detection table TB2' (step S54). Thereby, the current value is set as 40(%), the excitation method is set as 'w1-2 phase' and the rotating speed is set as 547.1 (rpm). The motor 31 is driven in accordance with the settings, so that the motor torque TR1 becomes 'medium.'

Subsequently, the CPU 20 controls the respective units in accordance with the 'rough detection table TB2', starts to rotate the motor 31 and thus moving the carriage 8 in the B direction of FIG. 3 (step S56). Subsequently, the CPU 20 determines whether a black-white tape is detected, specifically whether the black-white boundary is detected, based on the detection data of the reading unit 7 (step S58). Specifically, the detection data of the reading unit 7 is largely changed at the black-white boundary BP, so that the black-white boundary BP is detected.

When it is determined that the carriage 8 is moved in the B direction and the black-white boundary is thus detected (step S58: YES), the CPU 20 ends the rough detection processing while assuming that the carriage 8 is within the position of the white tape 55A beyond the black-white boundary BP in the B direction. On the other hand, when it is determined that the black-white boundary BP is not detected (step S58: NO), the CPU 20 rotates the motor 31 until the black-white boundary BP is detected, while assuming that the black-white boundary BP is not within the position of the white tape 55A beyond the black-white boundary BP in the B direction.

Subsequently, the CPU 20 determines whether the rough detection is successful, based on the detection data of the reading unit 7 (step S60). When it is determined that the rough detection is not successful (step S60: NO), the CPU 20 displays an error of the rough detection on the display unit 12. On the other hand, when it is determined that the rough detection is successful (step S60: YES), the CPU 20 performs a precise detection processing (step S70).

In the precise detection processing, it is more precisely and accurately determined whether the carriage 8 is in the vicinity of the black-white boundary BP. The motor rotation control in the precise detection processing is described with reference to FIG. 14.

Figure 14:
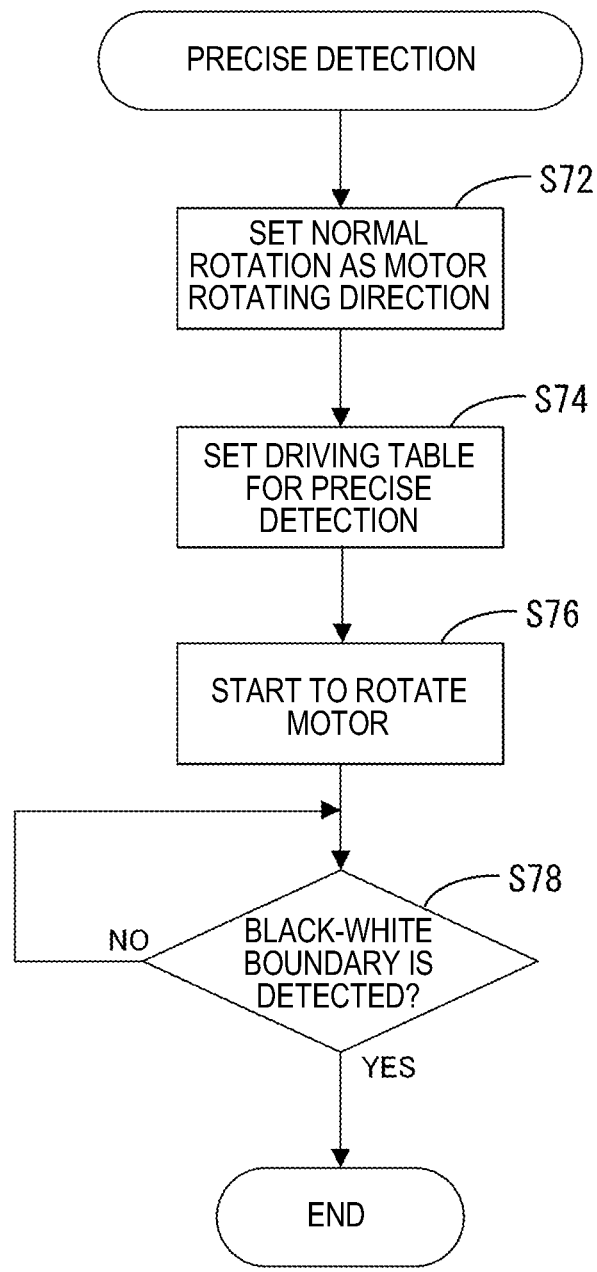

In FIG. 14, the CPU 20 first sets, as the motor rotating direction, the 'normal rotation' (step S72). Then, the CPU 20 sets, as the table for driving the motor 31, a 'precise detection table TB3' (step S74). Thereby, the current value is set as 40(%), the excitation method is set as 'w1-2 phase' and the rotating speed is set as 205.2 (rpm). The motor 31 is driven in accordance with the settings, so that the motor torque becomes 'large.' That is, at the precise detection, since it is necessary to slowly move the carriage 8 in the A direction, it is necessary to lower the rotating speed, so that the motor torque is increased. In the precise detection, the moving distance of the carriage 8 is about 2 mm. Hence, even though the torque is large, the motor rotating direction is the 'normal rotation', i.e., the rotating direction of the sun gear 15 is the 'normal rotation' and the revolving direction of the planet gear 17 is the direction toward the FB-side transmission gear 21. Therefore, the planet gear 17 is not separated from the FB-side transmission gear 21. That is, the planet gear 17 is not switched when performing the precise detection.

Subsequently, the CPU 20 controls the respective units in accordance with the 'precise detection table TB3', starts to rotate the motor 31 and thus slightly moves the carriage 8 in the A direction (step S76). Subsequently, the CPU 20 determines whether the black-white boundary BP is detected, based on the detection data of the reading unit 7 (step S78). When it is determined that the carriage 8 is moved in the A direction and the black-white boundary BP is thus detected (step S78: YES), the CPU 20 ends the precise detection processing while assuming that the carriage 8 is in the black-white boundary BP. On the other hand, when it is determined that the black-white boundary BP is not detected (step S78: NO), the CPU 20 rotates the motor 31 to thus move the carriage 8 in the A direction until the black-white boundary BP is detected, while assuming that the carriage 8 is not in the black-white boundary BP.

Subsequently, the CPU 20 determines whether the precise detection is successful, based on the detection data of the reading unit 7 (step S80). When it is determined that the precise detection is not successful (step S80: NO), the CPU 20 returns to the processing of step S50 and again executes the rough detection and precise detection. On the other hand, when it is determined that the precise detection is successful, i.e., when it is determined that the carriage 8 is in the black-white boundary BP (step S80: YES), the CPU 20 performs standby position moving processing (step S90).

In the standby position moving processing, the carriage 8 is moved from the black-white boundary BP to the standby position WP. In the exemplary embodiment, as described above, the standby position WP is the position of the white tape 55A. Specifically, as shown in FIG. 3, the standby position WP is a predetermined position within a range of the white tape 55A in the left-right direction, which is shown in FIG. 3. The motor rotation control in the standby position moving processing is described with reference to FIG. 15.

Figure 15:
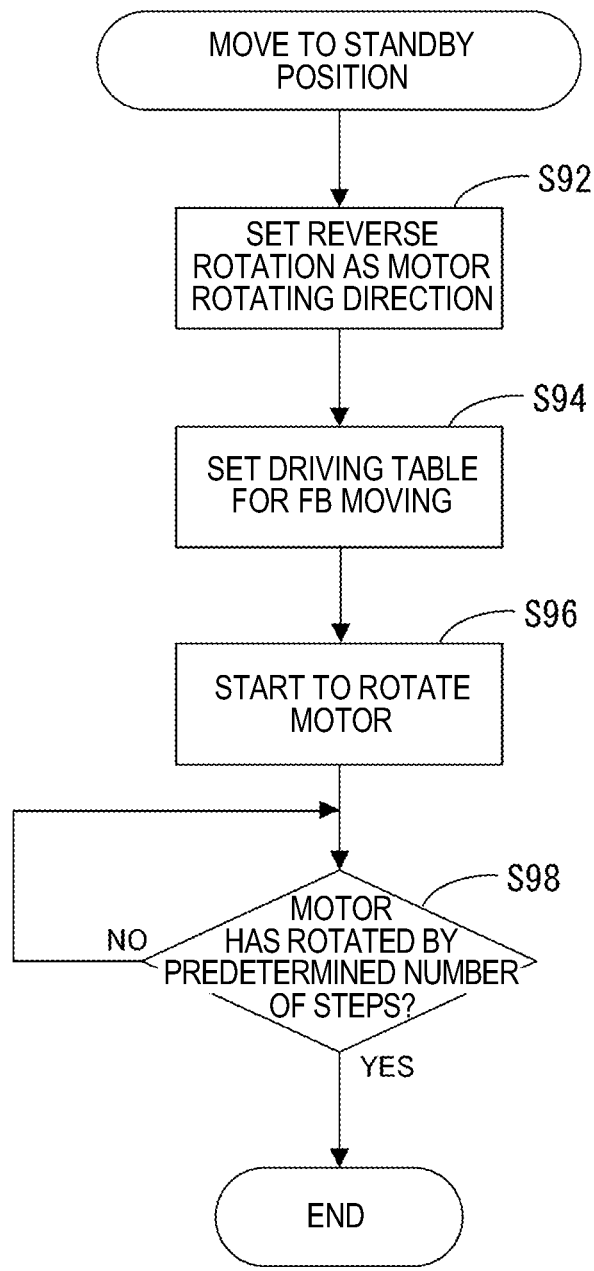

In FIG. 15, the CPU 20 first sets, as the motor rotating direction, the 'reverse rotation' (step S92). Then, the CPU 20 sets, as the driving table, an 'FB moving table TB4' (step S94). Thereby, the current value is set as 40(%), the excitation method is set as '2w1-2 phase' and the rotating speed is set as 1015.5 (rpm). The motor 31 is driven in accordance with the settings, so that the motor torque becomes 'small.'

Subsequently, the CPU 20 controls the respective units in accordance with the 'FB moving table TB4', and starts to rotate the motor 31 (step S96). Subsequently, the CPU 20 determines whether the motor 31 has rotated by a predetermined number of steps SN5, based on a count value of the counter 48 (step S98). Here, the predetermined number of steps SN5 is the number of steps for moving the carriage 8 from the black-white boundary BP to the standby position WP and is stored in the ROM 26.

When it is determined that the motor 31 has rotated by the predetermined number of steps SN5 (step S98: YES), the CPU 20 ends the standby position moving processing of step S90, while assuming that the carriage 8 is slightly moved from the black-white boundary BP in the B direction and reaches the standby position WP. On the other hand, when it is determined that the motor 31 has not rotated by the predetermined number of steps SN5 (step S98: NO), the CPU 20 rotates the motor 31 until the motor 31 rotates by the predetermined number of steps SN5, while assuming that the carriage 8 has not been moved to the standby position WP.

5-3. When Executing FB Reading

In the below, the motor rotation control when executing FB reading is described with reference to FIG. 16. Here, it is assumed that the carriage 8 is located at the standby position WP at the start of the FB reading.

In the motor rotation control when executing FB reading, the CPU 20 first sets, as the motor rotating direction, the 'normal rotation' (step S110) and sets, as the driving table, the 'FB reading table TB5' (step S115). The motor torque which is generated by the 'FB reading table TB5' is referred to as TR5. The motor torque TR5 is an example of a moving reading torque. In the 'FB reading table TB5', the current value is set as 40(%), the excitation method is set as '2w1-2 phase' and the rotating speed is set as 1015.5 (rpm), similar to the 'FB moving table TB4'. The motor 31 is driven in accordance with the settings, so that the motor torque (an example of a moving reading torque) TR5 at the time of document reading of the FB reading becomes 'small.'

That is, the respective magnitudes of the motor torque TR1 by the 'driving switching table TB1', a restraint torque TRF7 which is a torque generated by the restraint force, and the motor torque TR5 at the time of document reading of the FB reading have a following relation:

$$TR1 > TRF7 > TR5 \qquad \text{inequality expression 4}$$

By the above relation, when executing the moving reading, it is possible to securely suppress or prevent the rotation of the planet gear 17 from stepping out from the rotation of the motor 31 while suppressing or preventing the switching operation of the planet gear 17.

Subsequently, the CPU 20 sets a number of moving steps SN6, which is the number of steps moving the carriage 8 from the standby position WP to the reading ending position PE according to the reading range of the FB reading, and stores the number of moving steps SN6 in the NVRAM 28, for example (step S120).

Then, the CPU 20 controls the respective units in accordance with the 'FB reading table TB5', and starts to rotate the motor 31 and thus moving the carriage 8 in the A direction (step S125). Then, the CPU 20 determines whether the carriage 8 has been moved to the reading starting position PS, based on a count value of the counter 48 (step S130). At this time, the determination is performed depending on whether the motor has reached a number of starting steps SN7. The number of starting steps SN7 is a number of steps moving the carriage 8 from the standby position WP to the reading starting position PS and is stored in the ROM 26.

Subsequently, when it is determined that the motor 31 has rotated by the number of starting step SN7 and the carriage 8 has been thus moved to the reading starting position PS (step S130: YES), the CPU 20 also moves the carriage 8 in the A direction in accordance with the 'FB reading table TB5' and thus starts the FB reading (step S140). On the other hand, when it is determined that the motor 31 has not rotated by the number of starting step SN7 (step S130: NO), the CPU 20 rotates the motor 31 until the motor 31 rotates by the number of starting steps SN7 while assuming that the carriage 8 has not been moved to the reading starting position PS.

Subsequently, the CPU 20 determines whether the motor 31 has rotated by the number of moving steps SN6, based on a count value of the counter 48 (step S145). When it is determined that the motor 31 has rotated by the number of moving steps SN6 (step S145: YES), the CPU 20 determines that the carriage 8 has been moved to the reading ending position PE and the FB reading is over. Then, the CPU 20 sets, as the motor rotating direction, the 'reverse rotation' (step S150) and sets, as the driving table, the 'FB moving table TB4' (step S155: an example of a small torque control). Also, the CPU 20 sets, as the number of driving steps, the number of moving steps SN6 stored in the NVRAM 28 (step S160).

Subsequently, the CPU 20 controls the respective units in accordance with the 'FB moving table TB4', and starts to rotate the motor 31 and thus moving the carriage 8 in the B direction (step S165).

Subsequently, the CPU 20 determines whether the motor 31 has rotated by the number of moving steps SN6, based on a count value of the counter 48 (step S170). When it is determined that the motor 31 has rotated by the number of moving steps SN6 (step S170: YES), the CPU 20 determines that the carriage 8 has been moved to the standby position WP. On the other hand, when it is determined that the motor 31 has not rotated by the number of moving steps SN6 (step S170: NO), the CPU 20 rotates the motor 31 until the motor 31 rotates by the number of moving step SN6, while assuming that the carriage 8 has not been moved to the standby position WP. That is, in this exemplary embodiment, the carriage 8 is returned to the standby position WP at the end of the FB reading.

That is, while moving the carriage 8 in the B direction which is an opposite direction to that when executing the FB reading, the CPU 20 controls the motor 31 such that the motor torque becomes smaller than the motor torque when switching the planet gear 17.

The speed at which the carriage 8 is moved so as to execute the FB reading and the motor torque are proportional to each other. Therefore, as the motor torque which is applied to the FB-side transmission gear 21 is decreased, the moving speed of the carriage 8 is increased. Hence, when the motor 31 is controlled such that the motor torque becomes smaller, it is possible to shorten the time which is consumed after the FB reading is executed up to the end of the reading range of the document until the carriage returns to the standby position WP which is the position at the start of the FB reading.

5-4. Another Example of Last Part of FB Reading

Figure 17:
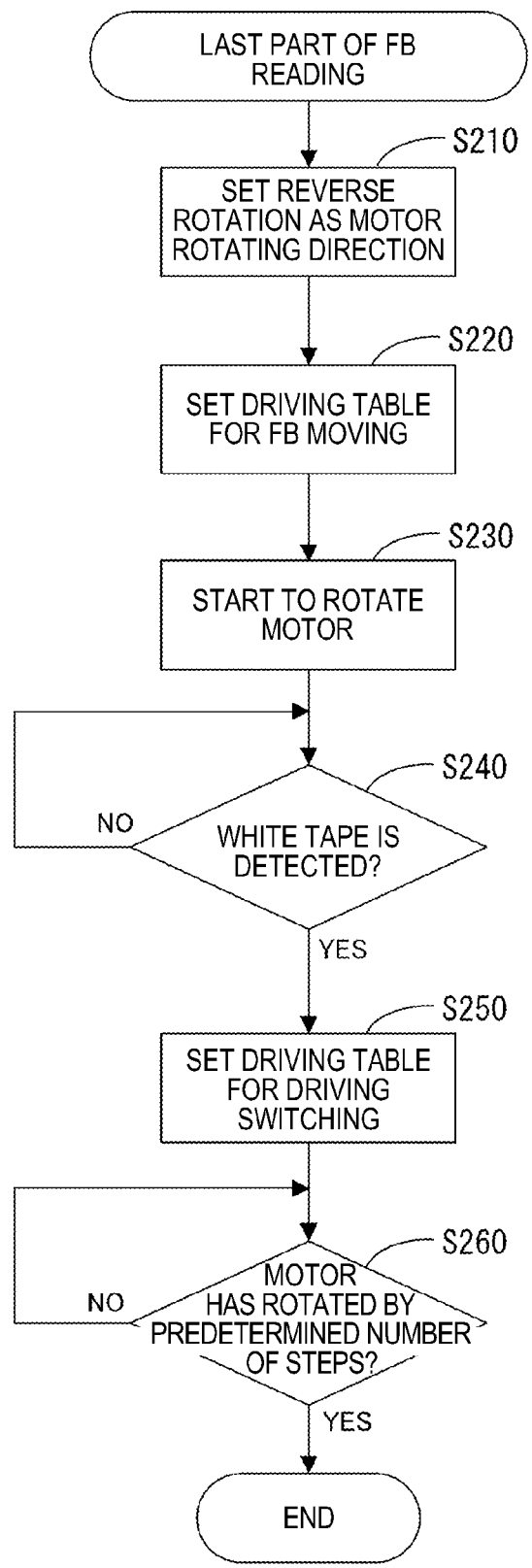
FIG. 17 is a flowchart showing another processing in the motor torque control when executing a last part of FB reading.

In the below, another example of the motor rotation control which is performed when the carriage 8 is returned from the FB reading ending position to the standby position WP at the last part of the FB reading is described with reference to FIG. 17.

Figure 16:
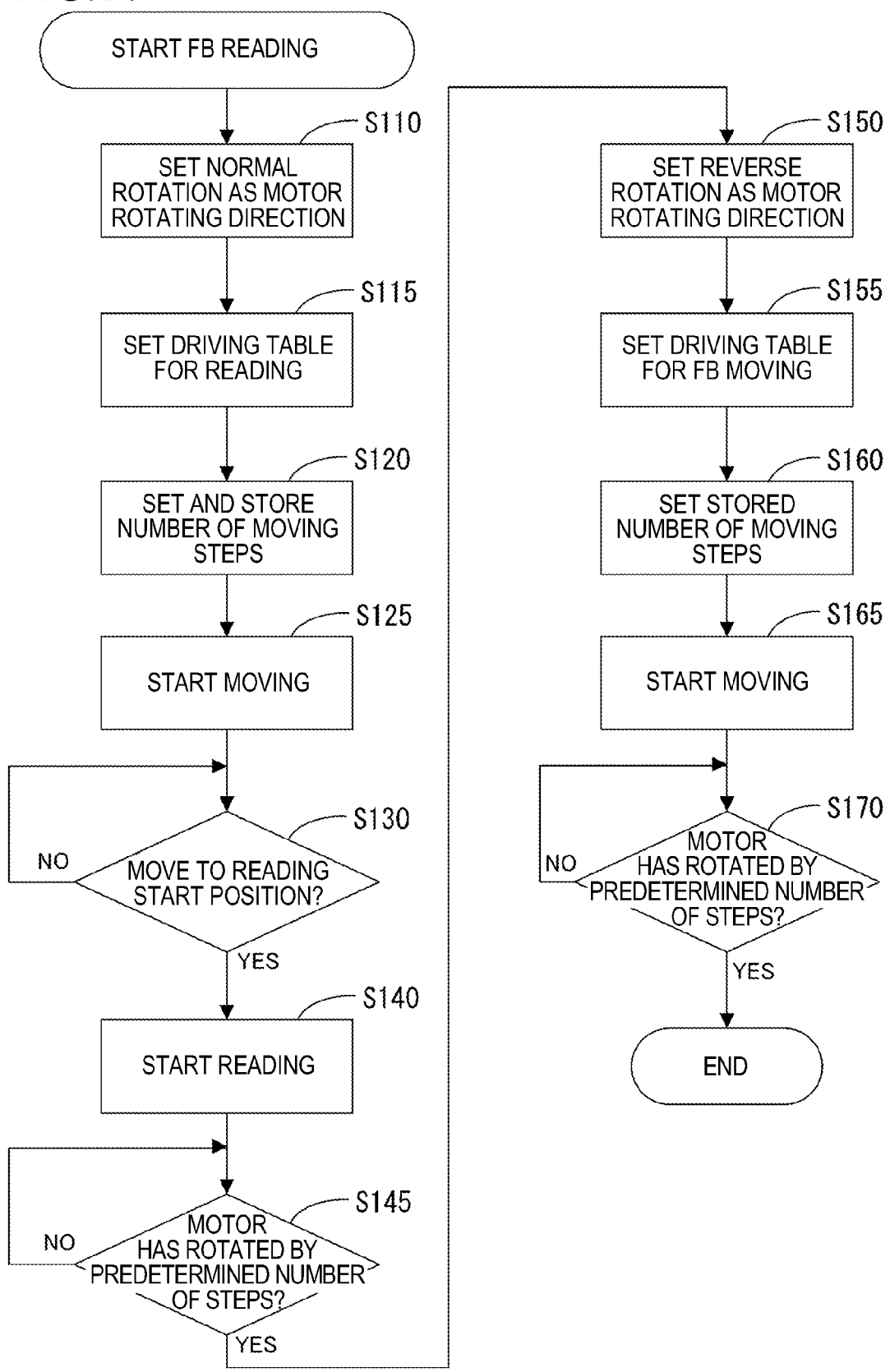
FIG. 16 is a flowchart showing processing in the motor torque control when executing FB reading.

In the FB reading processing, when the carriage 8 reaches the FB reading ending position PE and the FB reading is thus over, the CPU 20 sets, as the motor rotating direction, the 'reverse rotation' (step S210) and sets, as the driving table, the 'FB moving table TB4' (step S220), similar to the processing of FIG. 16. Subsequently, the CPU 20 controls the respective units in accordance with the 'FB moving table TB4', and starts to rotate the motor 31 and thus moving the carriage 8 in the B direction (step S230).

Subsequently, the CPU 20 determines whether the white tape 55A is detected by the reading unit 7 as the carriage 8 is moved in the B direction (step S240). When it is determined that the white tape 55A is detected (step S240: YES), the CPU 20 changes the driving table from the 'FB moving table TB4' to the 'driving switching moving table TB1' (step S250: an example of a large torque control).

On the other hand, when it is determined that the white tape 55A is not detected (step S240: NO), the CPU 20 rotates the motor 31 to thus move the carriage 8 in the B direction until the white tape 55A is detected, while assuming that the carriage 8 is not at the position of the white tape 55A.

Subsequently, the CPU 20 determines whether the motor 31 has rotated by the number of moving steps SN6, based on a count value of the counter 48 (step S260). When it is determined that the motor 31 has rotated by the number of moving steps SN6 (step S260: YES), the CPU 20 determines that the carriage 8 has reached the standby position WP. On the other hand, when it is determined that the motor 31 has not rotated by the number of moving steps SN6 (step S260: NO), the CPU 20 rotates the motor 31 until the motor 31 rotates by the number of moving steps SN6, while assuming that the carriage 8 has not been moved to the standby position WP.

In this example, when returning the carriage 8 from the FB reading ending position PE to the standby position WP, the CPU 20 changes the driving table from the 'FB moving table TB4' to the 'driving switching moving table TB1' at the time when the carriage 8 passes the position of the white tape 55A, thereby increasing the motor torque. Hence, when returning the carriage 8 to the standby position WP, even though the carriage 8 erroneously reaches the ADF reading position RP and the switching of the planet gear 17 from the FB-side position to the ADF-side position is made, it is possible to suppress or prevent the rotation of the planet gear 17 from stepping out from the rotation of the motor and thus an abnormal noise from occurring.

Specifically, when executing FB reading, when the rotation of the motor 31 steps out from the rotation of the sun gear 15 and the number of moving steps SN6 is counted at the step-out state of the motor 31 even though the carriage 8 has not reached the reading ending position PE, the CPU 20 erroneously recognizes that the carriage 8 has reached the reading ending position PE. At this erroneously recognized state, when the motor rotates by the number of moving steps SN6 and thus the carriage 8 returns in the B direction, the carriage moves leftward beyond the reading starting position PS, so that a risk of the gear switching occurs. Even when the risk occurs, it is possible to suppress or prevent the rotation of the planet gear 17 from stepping out from the rotation of the motor 31 and thus an abnormal noise from occurring.

6. Effects of Exemplary Embodiment

In this exemplary embodiment, as described above, when the CPU 20 controls the motor 31 to switch the planet gear 17, which is restrained from switching by the first spring 16, between the FB-side position and the ADF-side position, the CPU 20 generates the motor torque TR1 which is larger than the motor torque TR5 generated for the motor 31 at the time of document reading when executing the moving reading and which switches the planet gear 17 against the restraint force of the first spring 16, i.e., the motor torque TR1, which is larger than the restraint torque TRF7 generated by the restraint force of the first spring 16, for the motor 31. Thereby, the planet gear 17 can be securely separated from the FB-side transmission gear 21 or the ADF-side transmission gear 23. As a result, in the configuration of switching the planet gear 17 between the FB-side position and the ADF-side position, it is possible to suppress or prevent the rotation of the planet gear 17 from stepping out from the rotation of the motor 31 when switching.

Other Exemplary Embodiments

While the present invention has been shown and described with reference to certain illustrative embodiments thereof, it will be understood by those skilled in the art that various changes in form and details may be made therein without departing from the spirit and scope of the invention as defined by the appended claims.

(1) In the above exemplary embodiment, the sun gear 15 and the planet gear 17 of the planet gear mechanism have been used as the motor-side transmission gear and the switching gear. However, the invention is not limited thereto. As the motor-side transmission gear, a gear different from the sun gear may be used, and also, as the switching gear, another configuration which is switched between the FB-side position coupling the motor-side transmission gear and the FB-side transmission gear 71 and the ADF-side position coupling the motor-side transmission gear and the ADF-side transmission gear 23 may be used.

(2) In the above exemplary embodiment, the CPU 20 has been described as an example of the motor control unit and the determination unit. However, the invention is not limited thereto. For example, the motor control unit and the determination unit may be configured by a plurality of circuits including an ASIC or may be configured by a CPU and a separate circuit.

What is claimed is:

1. An image reading apparatus comprising:
a reading unit configured to read an image of a document;
a feeding unit configured to feed the document;
a carriage configured to be moved in a predetermined direction while holding the reading unit;
a motor;
a motor-side transmission gear configured to transmit power supplied from the motor;
a feeding unit-side transmission gear configured to transmit the power to the feeding unit when executing a feeding reading of the reading unit reading the image of the document which is fed by the feeding unit;
a carriage-side transmission gear configured to transmit the power to the carriage when executing a moving reading of the reading unit reading the image of the document while moving the carriage;
a switching gear configured to switch between a meshing state of meshing with the feeding unit-side transmission gear at a feeding unit-side position where the switching gear couples the motor-side transmission gear and the feeding unit-side transmission gear when executing the feeding reading and a meshing state of meshing with the carriage-side transmission gear at a carriage-side position where the switching gear couples the motor-side transmission gear and the carriage-side transmission gear when executing the moving reading; a restraint member configured to apply, to the switching gear,
a restraint force for restraining the switching of the switching gear when executing the moving reading or the feeding reading; and
a motor control unit configured, in a case when switching the switching gear which is restrained from switching by the restraint member between the carriage-side position and the feeding unit-side position, to execute a large torque control of controlling the motor to generate a switching torque which is larger than a moving reading torque to be generated by the motor at a time of document reading when executing the moving reading and which causes the switching gear to switch against the restraint force of the restraint member.

2. The image reading apparatus according to claim 1, wherein the case when switching the switching gear between the carriage-side position and the feeding unit-side position is a case when the motor control unit controls a rotating direction of the motor in a direction of switching the switching gear from the carriage-side position toward the feeding unit-side position, and
wherein the motor control unit is configured to execute the large torque control in the case when the motor control unit controls the rotating direction of the motor in the direction of switching the switching gear from the carriage-side position toward the feeding unit-side position.

3. The image reading apparatus according to claim 1, wherein the motor is a stepping motor,
wherein the image forming apparatus further comprises:
a storage unit configured to store therein a number of steps of the stepping motor by which the carriage is moved for the moving reading, and wherein the motor control unit is configured to execute a small torque control of controlling the motor to generate torque which is smaller than the switching torque in a case when moving the carriage by the number of steps stored in the storage unit in an opposite direction to a direction in the moving reading after driving the motor by the number of steps by which the carriage is moved for the moving reading.

4. The image reading apparatus according to claim 1, further comprising:
a determination unit configured, when the carriage is moved, to determine whether a predetermined condition relating to the moving of the carriage is satisfied, and
wherein the motor control unit is configured to execute a small torque control of controlling the motor to generate a torque which is smaller than the switching torque when the determination unit determines that the predetermine condition is satisfied in a case when the motor control unit controls a rotating direction of the motor in a direction of switching the switching gear from the feeding unit-side position toward the carriage-side position.

5. The image reading apparatus according to claim 4,
wherein the motor is a stepping motor,
wherein the image reading apparatus further comprises:
a count unit configured to count a number of steps of the stepping motor,
wherein the predetermined condition is that the number of steps counted by the count unit becomes a predetermined number of steps, and wherein the motor control unit is configured to execute the small torque control when the determination unit determines that the number of steps counted by the count unit becomes the predetermined number of steps.

6. The image reading apparatus according to claim 4,
wherein a mark is provided on a moving path along which the carriage is moved,
wherein the predetermined condition is that the reading unit moved while being held by the carriage reads the mark, and
wherein the motor control unit is configured to execute the small torque control when the determination unit determines that the reading unit moved while being held by the carriage reads the mark.

7. The image reading apparatus according to claim 1,
wherein the feeding unit-side transmission gear includes a reverse rotation preventing mechanism which allows a rotation of the feeding unit-side transmission gear in a direction in which the feeding unit feeds the document and prevents the rotation in an opposite direction thereto, and
wherein the motor control unit is configured to execute the large torque control at a state where the feeding unit-side transmission gear is prevented from rotating by the reverse rotation preventing mechanism, in a case when switching the switching gear from the feeding unit-side position to the carriage-side position.

8. The image reading apparatus according to claim 1, further comprising:
a load member which is configured to restrain the carriage-side transmission gear from rotating when the carriage is located at a feeding reading position which is a reading position when executing the feeding reading, and
wherein the motor control unit is configured to execute the large torque control at a state where the carriage-side transmission gear is restrained from rotating by the load member, in a case when switching the switching gear from the carriage-side position to the feeding unit-side position.

9. The image reading apparatus according to claim 1,
wherein the motor includes:
a rotation part configured to rotate about a predetermined shaft; and
a plurality of driving parts configured to interact with the rotation part to thus rotate the rotation part by being applied with a current,
wherein the image reading apparatus further comprises:
a current control unit configured to control a current amount of the current to be applied to the driving parts, and
wherein the motor control unit controls the current control unit to increase the current amount which is applied to the driving parts, thereby executing the large torque control.

10. The image reading apparatus according to claim 1,
wherein the motor includes:
a rotation part configured to rotate about a predetermined shaft; and
a plurality of driving parts configured to interact with the rotation part to thus rotate the rotation part,
wherein the image reading apparatus further comprises:
a driving control unit configured to control a driving speed at which the driving parts are driven, and
wherein the motor control unit controls the driving control unit to decrease the driving speed of the driving parts, thereby executing the large torque control.

11. The image reading apparatus according to claim 1, further comprising:
a support member which supports the switching gear; and
a fixing part which fixes one end of the restraint member,
wherein the restraint member has the other end which is different from the one end and is connected to a side of the support member opposite to a side supporting the switching gear, and converts an attractive force attracting the fixing part and the other end into the restraint force.

12. The image reading apparatus according to claim 1,
wherein the switching torque is larger than a restraint torque which is generated by the restraint force, and the restraint torque is larger than the moving reading torque.

* * * * *